(12) United States Patent
Noureddine et al.

(10) Patent No.: US 11,038,807 B2
(45) Date of Patent: Jun. 15, 2021

(54) TIMER MANAGEMENT FOR NETWORK DEVICES

(71) Applicant: Fungible, Inc., Santa Clara, CA (US)

(72) Inventors: Wael Noureddine, Santa Clara, CA (US); Jean-Marc Frailong, Rancho Mirage, CA (US)

(73) Assignee: Fungible, Inc., Santa Clara, CA (US)

( * ) Notice: Subject to any disclaimer, the term of this patent is extended or adjusted under 35 U.S.C. 154(b) by 85 days.

(21) Appl. No.: 16/569,360

(22) Filed: Sep. 12, 2019

(65) Prior Publication Data

US 2020/0092220 A1 Mar. 19, 2020

Related U.S. Application Data

(60) Provisional application No. 62/731,429, filed on Sep. 14, 2018.

(51) Int. Cl.
*H04L 12/863* (2013.01)
*H04L 29/06* (2006.01)
*G06F 1/14* (2006.01)

(52) U.S. Cl.
CPC ............ *H04L 47/6245* (2013.01); *G06F 1/14* (2013.01); *H04L 69/28* (2013.01)

(58) Field of Classification Search
CPC ........ H04L 47/6245; H04L 69/28; G06F 1/14
See application file for complete search history.

(56) References Cited

U.S. PATENT DOCUMENTS

| | | | | |
|---|---|---|---|---|
| 5,838,957 A | * | 11/1998 | Rajaraman | G06F 9/4825 713/502 |
| 6,718,479 B1 | * | 4/2004 | Christenson | G06F 1/14 713/502 |
| 7,024,481 B2 | * | 4/2006 | Kaniyar | H04L 69/28 709/227 |
| 7,106,693 B1 | * | 9/2006 | Turner | H04L 47/568 370/230 |

(Continued)

OTHER PUBLICATIONS

International Search Report and Written Opinion of International Application No. PCT/US2019/050855, dated Nov. 19, 2019, 16 pp.

(Continued)

*Primary Examiner* — Ajay Cattungal
(74) *Attorney, Agent, or Firm* — Shumaker and Sieffert, P.A.

(57) ABSTRACT

Timer management techniques are described. An example processing device includes a memory configured to store successive wheels available to be included in traversal paths for timers running on the device, each wheel representing a queue of timers, each wheel having a different, corresponding time delay (TO) value for queuing a timer, and processing circuitry in communication with the memory. The processing circuitry is configured to determine, in response to a request for a timer, a total traversal time for the timer, to select, from the stored wheels, a subset of wheels such that a sum of the respective TO values of the selected subset is within a predetermined margin of error with respect to the total traversal time for the timer, and to sequence the selected subset of wheels based on the respective TO values of the selected subset of wheels to form a traversal path for the timer.

26 Claims, 15 Drawing Sheets

(56) References Cited

U.S. PATENT DOCUMENTS

| | | | |
|---|---|---|---|
| 8,307,030 B1* | 11/2012 | Hu ..................... | H04L 43/022 709/203 |
| 2005/0268144 A1* | 12/2005 | Doering ................ | G06F 1/14 713/600 |
| 2014/0298073 A1* | 10/2014 | Zhou .................... | G06F 9/4837 713/502 |
| 2015/0234419 A1 | 8/2015 | Bar et al. | |
| 2018/0212885 A1* | 7/2018 | Contavalli ............ | H04L 47/193 |
| 2018/0287965 A1 | 10/2018 | Sindhu et al. | |
| 2018/0293168 A1 | 10/2018 | Noureddine et al. | |
| 2019/0012278 A1 | 1/2019 | Sindhu et al. | |
| 2019/0012350 A1 | 1/2019 | Sindhu et al. | |
| 2019/0013965 A1 | 1/2019 | Sindhu et al. | |

OTHER PUBLICATIONS

Varghese et al., "Hashed and Hierarchical Timing Wheels: Efficient Data Structures for Implementing a Timer Facility," IEEE/ACM Transactions on Networking, vol. 5, No. 6, Dec. 1997, pp. 824-834.
International Preliminary Report on Patentability from International Application No. PCT/US2019/050855, dated Mar. 25, 2021, 10 pp.

\* cited by examiner

TIMER MANAGEMENT FOR NETWORK DEVICES

This application claims the benefit of U.S. Provisional Patent Application No. 62/731,429 filed on 14 Sep. 2018, the entire content of which is incorporated by reference herein.

TECHNICAL FIELD

The disclosure relates to timer management for devices configured to process information streams, for example, for network communication and data storage purposes.

BACKGROUND

In a typical computer network, a large collection of interconnected servers provides computing and/or storage capacity for execution of various applications. A data center is one example of a large-scale computer network and typically hosts applications and services for subscribers, i.e., customers of the data center. The data center may, for example, host all of the infrastructure equipment, such as compute nodes, networking infrastructure, storage systems, power systems, and environmental control systems. In most data centers, clusters of storage systems and application servers are interconnected via a high-speed switch fabric provided by one or more tiers of physical network switches and routers. Data centers vary greatly in size, with some public data centers containing hundreds of thousands of servers, and are usually distributed across multiple geographies for redundancy.

Many devices within a computer network, e.g., storage servers, computing servers, firewalls, intrusion detection devices, switches, routers, or other network attached devices, often use timers to control processing of data, e.g., packets, and other events. Moreover, the devices often require timers of fine granularity and precision as well as timers of longer duration. Conventional techniques for implementing and managing timers, however, are often unable to accommodate the demands of large-scale networks, such as modern data centers, in which a typical device may require thousands or even millions of timers of various durations to be maintained concurrently.

SUMMARY

In general, this disclosure describes techniques for implementing and managing timers in demanding networking and/or data processing environment. In one example, the techniques are implemented in a highly programmable device, referred to generally as a data processing unit, having multiple processing units for processing streams of information, such as network packets or storage packets. In some examples, the processing units may be general purpose processing cores, and in other examples, the processing units may be virtual processors, hardware threads, hardware blocks, or other sub-processing core units. As described herein, the data processing unit includes one or more specialized timer managers.

In particular, as further described herein, examples of processing units and/or access nodes are disclosed in which a specialized timer manager employs a waterfall timer architecture that enables thousands or even millions of timers to be maintained concurrently. For example, the processing units are typically required to maintain numerous concurrent timers, sometimes on the order of millions of concurrent timers or more, to support various data processing, storage and communication functionalities for large-scale networks. As examples, the timer manager of this disclosure may coordinate timers that support critical functions of the networking and storage stacks, such as error detection and recovery, rate control, congestion management, state machine sequencing, keepalives, heartbeats, maintenance, garbage collection, coalescing, batching, time-based heuristics monitoring, and others. Timer managers of this disclosure may employ waterfall architecture to manage the numerous timers that drive the various functionalities of a processing unit, where each concurrent timer may be defined in terms of one or more cascading time intervals, thereby allowing timers of larger duration to be defined in terms of multiple, cascading smaller time intervals. The techniques may provide numerous technical advantages in terms of efficiency and reduction of computational and memory resources necessary to maintain high volumes of concurrent timers.

In one example, a device includes a memory unit configured to store a plurality of successive first-in-first-out (FIFO) timer structures, referred to herein as "wheels," available to be included in traversal paths for timers running on the device, each of the wheels representing a queue of timers, and each of the wheels having a different, corresponding time delay (TO) values for queuing a timer. The device also includes processing circuitry in communication with the memory unit. The processing circuitry is configured to determine, in response to a request for a timer, a total traversal time with respect to the timer, to select, from the plurality of wheels stored to the memory unit, a subset of wheels such that a sum of the respective TO values of the selected subset of wheels is within a predetermined margin of error with respect to the total traversal time for the timer, and to sequence the selected subset of wheels according to a descending order of the respective TO values of the selected subset of wheels to form a traversal path with respect to the timer.

In another example, a method includes maintaining, by a timer manager of a device, a plurality of successive wheels available to be included in traversal paths for timers running on the device, each of the wheels representing a queue of timers, and each of the wheels having a different, corresponding time delay (TO) values for queuing a timer. The method further includes determining, responsive to a request for a timer, by the timer manager of the device, a total traversal time with respect to the timer, and selecting, by the timer manager of the device, from the plurality of wheels, a subset of wheels such that a sum of the respective TO values of the selected subset of wheels is within a predetermined margin of error with respect to the total traversal time for the timer. The method further includes sequencing, by the timer manager of the device, the selected subset of wheels according to a descending order of the respective TO values of the selected subset of wheels to form a traversal path with respect to the timer.

In another example still, an apparatus includes means for maintaining a plurality of successive wheels available to be included in traversal paths for timers running on the device, each of the wheels representing a queue of timers, and each of the wheels having a different, corresponding time delay (TO) values for queuing a timer, and means for determining, in response to a request for a timer, a total traversal time with respect to the timer. The apparatus also includes means for selecting, from the plurality of wheels, a subset of wheels such that a sum of the respective TO values of the selected subset of wheels is within a predetermined margin of error with respect to the total traversal time for the timer, and means for sequencing the selected subset of wheels according to a descending order of the respective TO values of the selected subset of wheels to form a traversal path with respect to the timer.

In yet another example, a non-transitory computer-readable storage medium is encoded with instructions that, when executed, cause processing circuitry of a device to store, to a computer-readable storage medium, a plurality of successive wheels available to be included in traversal paths for timers running on the device, each of the wheels representing a queue of timers, and each of the wheels having a different, corresponding time delay (TO) values for queuing a timer, and to determine, in response to a request for a timer, a total traversal time with respect to the timer. The instructions, when executed, further cause the processing circuitry of the device to select, from the plurality of wheels, a subset of wheels such that a sum of the respective TO values of the selected subset of wheels is within a predetermined margin of error with respect to the total traversal time for the timer, and to sequence the selected subset of wheels according to a descending order of the respective TO values of the selected subset of wheels to form a traversal path with respect to the timer.

The techniques of this disclosure address timer management, which is a critical function of access nodes and processing units/clusters. The timer manager of this disclosure represents tradeoffs between timer implementations, such as tradeoffs between the higher-precision but more expensive and complex hardware timers, and the more numerous, but lower-precision software timers.

The details of one or more examples are set forth in the accompanying drawings and the description below. Other features, objects, and advantages will be apparent from the description and drawings, and from the claims.

DETAILED DESCRIPTION

Figure 1:
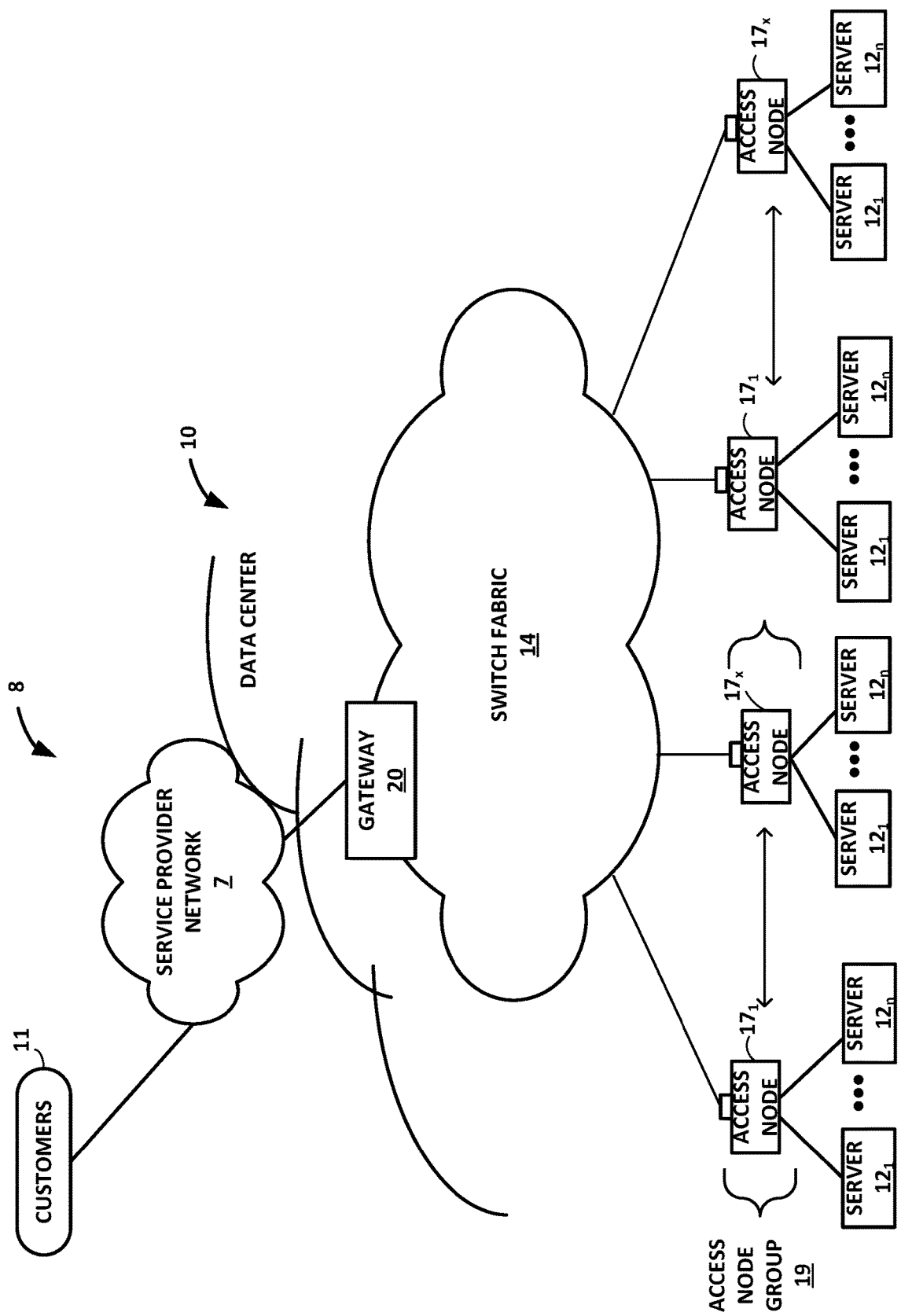
FIG. 1 is a block diagram illustrating an example system including one or more network devices configured to efficiently process a series of work units in a multiple core processor system.

FIG. 1 is a block diagram illustrating an example system 8 having a data center 10 in which examples of the techniques described herein may be implemented. In general, data center 10 provides an operating environment for applications and services for customers 11 coupled to the data center by service provider network 7 and gateway device 20. Data center 10 may, for example, host infrastructure equipment, such as compute nodes, networking and storage systems, redundant power supplies, and environmental controls. Service provider network 7 may be coupled to one or more networks administered by other providers, and may thus form part of a large-scale public network infrastructure, e.g., the Internet.

In some examples, data center 10 may represent one of many geographically distributed network data centers. In the example of FIG. 1, data center 10 is a facility that provides information services for customers 11. Customers 11 may be collective entities such as enterprises and governments or individuals. For example, a network data center may host web services for several enterprises and end users. Other exemplary services may include data storage, virtual private networks, file storage services, data mining services, scientific- or super-computing services, and so on.

In the illustrated example, data center 10 includes a set of storage systems and application servers 12 interconnected via a high-speed switch fabric 14. In some examples, servers 12 are arranged into multiple different server groups, each including any number of servers up to, for example, n servers $12_1$-$12_n$. Servers 12 provide computation and storage facilities for applications and data associated with customers 11 and may be physical (bare-metal) servers, virtual machines running on physical servers, virtualized containers running on physical servers, or combinations thereof.

In the example of FIG. 1, each of servers 12 is coupled to switch fabric 14 by an access node 17. In example implementations, access nodes 17 are configurable to operate in a standalone network appliance having one or more access nodes. For example, access nodes 17 may be arranged into multiple different access node groups 19, each including any number of access nodes up to, for example, x access nodes $17_1$-$17_x$.

As further described herein, in one example, each access node 17 is a highly programmable I/O processor, referred to generally herein as a data processing unit (DPU), specially designed for offloading certain functions from servers 12. In one example, each access node 17 includes two or more processing cores consisting of a number of internal processor clusters equipped with hardware engines that offload cryptographic functions, compression/decompression and regular expression (RegEx) processing, data storage functions and networking operations. In this way, each access node 17 includes components for fully implementing and processing network and storage stacks on behalf of one or more servers 12. In addition, access nodes 17 may be programmatically configured to serve as a security gateway for its respective servers 12, freeing up the processors of the servers to dedicate resources to application workloads. In some example implementations, each access node 17 may be viewed as a network interface subsystem that implements full offload of the handling of data packets (with zero copy in server memory) and storage acceleration for the attached server systems. In one example, each access node 17 may be implemented as one or more application-specific integrated circuits (ASICs) (e.g., a hardware ASIC) or other hardware and software components, each supporting a subset of the servers. Further example details of a DPU are described in in U.S. Provisional Patent Application No. 62/559,021, filed Sep. 15, 2017, entitled "Access Node for Data Centers," U.S. patent application Ser. No. 16/031,676, filed Jul. 10, 2018, entitled "Access Node for Data Centers," U.S. Provisional Patent Application No. 62/530,691, filed Jul. 10, 2017, entitled "Data Processing Unit for Computing Devices," U.S. patent application Ser. No. 16/031,921, filed Jul. 10, 2018, entitled ""Data Processing Unit for Compute Nodes and Storage Nodes," and U.S. patent application Ser. No. 16/031,945, filed Jul. 10, 2018, entitled "Data Processing Unit for Stream Processing," the entire contents of each of which are incorporated herein by reference.

In the example of FIG. 1, each access node 17 provides connectivity to switch fabric 14 for a different group of servers 12 and may be assigned respective IP addresses and provide routing operations for the servers 12 coupled thereto. Access nodes 17 may interface with and utilize switch fabric 14 so as to provide full mesh (any-to-any) interconnectivity such that any of servers 12 may communicate packet data for a given packet flow to any other of the servers using any of a number of parallel data paths within the data center 10. In addition, access nodes 17 described herein may provide additional services, such as storage (e.g., integration of solid-state storage devices), security (e.g., encryption), acceleration (e.g., compression), I/O offloading, and the like. In some examples, one or more of access nodes 17 may include storage devices, such as high-speed solid-state drives or rotating hard drives, configured to provide network accessible storage for use by applications executing on the servers. More details on the data center network architecture and interconnected access nodes illustrated in FIG. 1 are available in U.S. Provisional Patent Application No. 62/514,583, filed Jun. 2, 2017, entitled "Non-Blocking Any-to-Any Data Center Network with Packet Spraying Over Multiple Alternate Data Paths,", the entire content of which is incorporated herein by reference.

Various example architectures of access nodes 17 are described below in greater detail. With respect to either example, the architecture of each access node 17 comprises a multiple core processor system that represents a high performance, hyper-converged network, storage, and data processor and input/output hub. The architecture of each access node 17 is optimized for high performance and high efficiency stream processing.

A stream is defined as an ordered, unidirectional sequence of computational objects that can be of unbounded or undetermined length. In a simple example, a stream originates in a producer and terminates at a consumer, is operated on sequentially, and may be flow-controlled. In some examples, a stream can be defined as a sequence of stream fragments; each stream fragment including a memory block contiguously addressable in physical address space, an offset into that block, and a valid length.

As described herein, processing of stream information may be associated with a "work unit." A work unit (WU) is a logical container that is associated with a stream state and used to describe (i.e. point to) data within a stream (stored in memory) along with any associated meta-data and operations to be performed on the data. In the example of FIG. 1, work units may dynamically originate within a peripheral unit of one of access nodes 17 (e.g. injected by a networking unit, a host unit, or a solid state drive interface), or within a processor of the one of access nodes 17, in association with one or more streams of data, and terminate at another peripheral unit or another processor of the one of access nodes 17. The work unit is associated with an amount of work that is relevant to the entity executing the work unit for processing a respective portion of a stream.

In general, devices within data center 10, such as servers 12, access nodes 17, elements of switch fabric 14, utilize timers to control processing of data, e.g., packets, and other events. Moreover, the devices often require timers of fine granularity and precision as well as timers of longer duration. Conventional techniques for implementing and managing timers, however, are often unable to accommodate the demands of large-scale application, such as deployed in modern data centers, in which a typical device may require thousands or even millions of timers of various durations to be maintained concurrently. Techniques are described herein for implementing and managing timers in demanding networking and/or data processing environment, such as the network environment of data center 10. The techniques may be implemented by any device and are described for purposes of example with respect to access nodes 17.

In general, access nodes 17 may implement individual timers to support any one or any combination of critical functions, such as networking and storage stacks, such as network compliance, storage stack functionalities, error detection, error resilience/recovery, rate control, congestion management, state machine sequencing, keepalives, heartbeats, maintenance, garbage collection, coalescing, batching, time-based heuristics monitoring, and others. In many use case scenarios, such as large-scale data centers, the number of timers concurrently executing on one or more of access nodes 17 (or other network devices, such as routers or switches) can number in the millions. In accordance with this disclosure, timer managers of access nodes 17 coordinate the numerous individual timers concurrently executing on access nodes 17 using a waterfall architecture to manage the timers that drive the various functionalities of any individual node of access nodes 17. As described herein, using the waterfall architecture, the timer managers of access nodes 17 may each define and represent individual concurrent timers in terms of one or more cascading time intervals, thereby allowing timers of larger duration to be defined in terms of multiple, cascading smaller time intervals. The techniques may provide numerous technical advantages in terms of efficiency and reduction of computational and memory resources necessary to maintain high volumes of concurrent timers.

Figure 2:
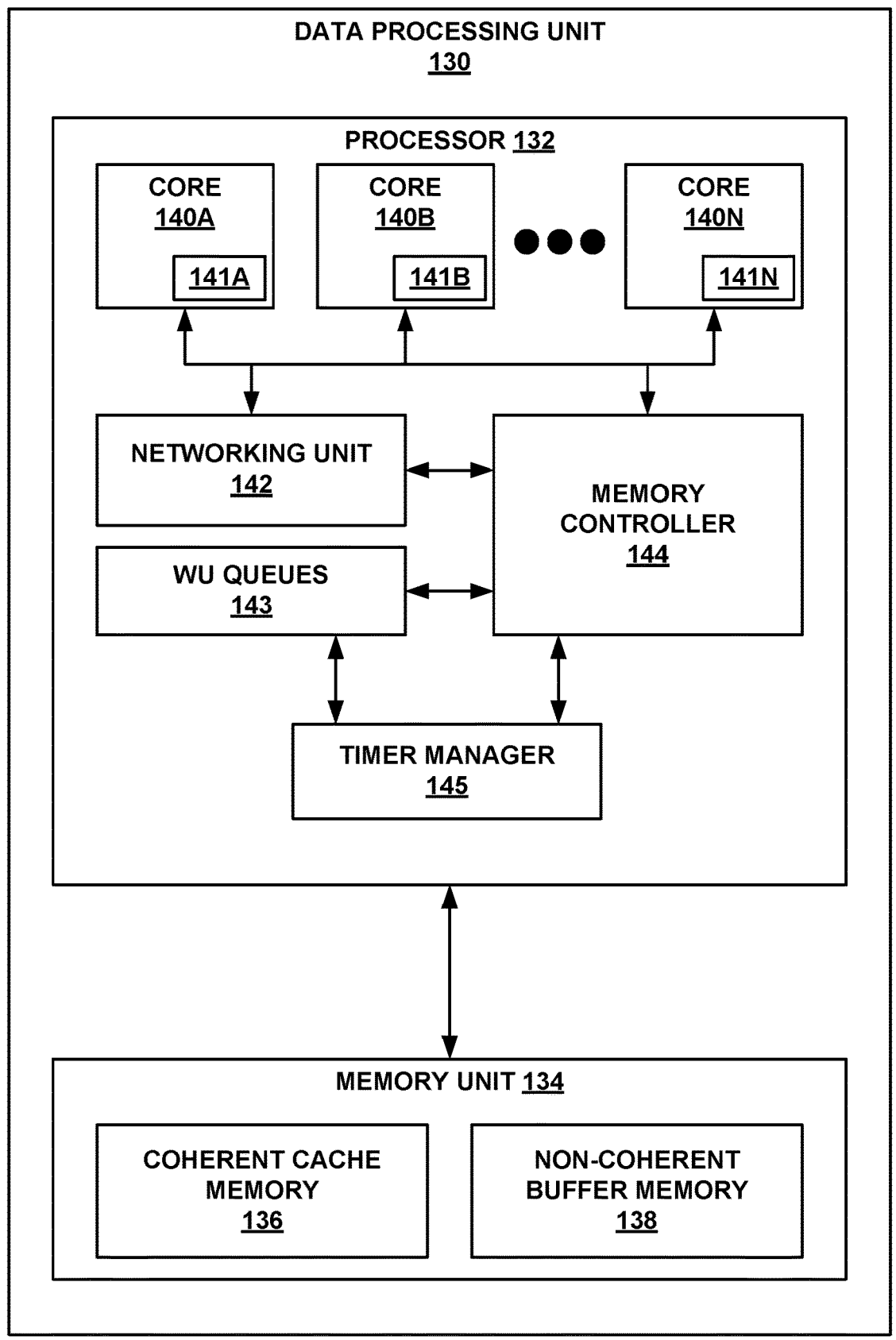
FIG. 2 is a block diagram illustrating an example data processing unit (DPU) including two or more processing cores, in accordance with aspects of this disclosure.

FIG. 2 is a block diagram illustrating an example data processing unit 130 including two or more processing cores. Data processing unit 130 generally represents a hardware chip implemented in digital logic circuitry and may be used in any computing or network device. Data processing unit 130 may operate substantially similar to any of access nodes 17 of FIG. 1. As other examples, data processing unit 130 may be incorporated within devices of switch fabric 14 (e.g., routers or switches) or any of servers 12, which may be compute nodes, storage nodes or combinations thereof. Thus, data processing unit 130 may be communicatively coupled to one or more network devices, server devices (e.g., servers 12), random access memory, storage media (e.g., solid state drives (SSDs)), a data center fabric (e.g., switch fabric 14), or the like, e.g., via PCI-e, Ethernet (wired or wireless), or other such communication media.

In the illustrated example of FIG. 2, data processing unit 130 includes a multi-core processor 132 having a plurality of programmable processing cores 140A-140N ("cores 140") coupled to an on-chip memory unit 134. Memory unit 134 may include two types of memory or memory devices, namely coherent cache memory 136 and non-coherent buffer memory 138. Processor 132 also includes a networking unit 142, work unit (WU) queues 143, and a memory controller 144. As illustrated in FIG. 2, each of cores 140, networking unit 142, WU queues 143, memory controller 144, and memory unit 134 are communicatively coupled to each other. In some examples, processor 132 of data processing unit 130 further includes one or more accelerators (not shown) configured to perform acceleration for various data-processing functions, such as look-ups, matrix multiplication, cryptography, compression, regular expressions, or the like.

In this example, data processing unit 130 represents a high performance, hyper-converged network, storage, and data processor and input/output hub. For example, networking unit 142 may be configured to receive one or more data packets from and transmit one or more data packets to one or more external devices, e.g., network devices. Networking unit 142 may perform network interface card functionality, packet switching, and the like, and may use large forwarding tables and offer programmability. Networking unit 142 may expose Ethernet ports for connectivity to a network, such as switch fabric 14 of FIG. 1. Data processing unit 130 may also include one or more interfaces for connectivity to host devices (e.g., servers) and data storage devices, e.g., solid state drives (SSDs) via PCIe lanes. Data processing unit 130 may further include one or more high bandwidth interfaces for connectivity to off-chip external memory.

Memory controller 144 may control access to on-chip memory unit 134 by cores 140, networking unit 142, and any number of external devices, e.g., network devices, servers, external storage devices, or the like. Memory controller 144 may be configured to perform a number of operations to perform memory management in accordance with the present disclosure. For example, memory controller 144 may be capable of mapping accesses from one of the cores 140 to either of coherent cache memory 136 or non-coherent buffer memory 138. More details on the bifurcated memory system included in the DPU are available in U.S. Provisional Patent Application No. 62/483,844, filed Apr. 10, 2017, and titled "Relay Consistent Memory Management in a Multiple Processor System,", the entire content of which is incorporated herein by reference.

Cores 140 may comprise one or more microprocessors without interlocked pipeline stages (MIPS) cores, advanced reduced instruction set computing (RISC) machine (ARM) cores, performance optimization with enhanced RISC—performance computing (PowerPC) cores, RISC five (RISC-V) cores, or complex instruction set computing (CISC or x86) cores. Each of cores 140 may be programmed to process one or more events or activities related to a given data packet such as, for example, a networking packet or a storage packet. Each of cores 140 may be programmable using a high-level programming language, e.g., C, C++, or the like.

In some examples, the plurality of cores 140 executes instructions for processing a plurality of events related to each data packet of one or more data packets, received by networking unit 142, in a sequential manner in accordance with one or more work units associated with the data packets. As described above, work units are sets of data exchanged between cores 140 and networking unit 142 where each work unit may represent one or more of the events related to a given data packet.

As one example use case, stream processing may be divided into work units executed at a number of intermediate processors between source and destination. Depending on the amount of work to be performed at each stage, the number and type of intermediate processors that are involved may vary. In processing a plurality of events related to each data packet, a first one of the plurality of cores 140, e.g., core 140A may process a first event of the plurality of events. Moreover, first core 140A may provide to a second one of plurality of cores 140, e.g., core 140B a first work unit of the one or more work units. Furthermore, second core 140B may process a second event of the plurality of events in response to receiving the first work unit from first core 140B.

For example, the work unit message may be a four-word message including a pointer to a memory buffer. The first word may be a header containing information necessary for message delivery and information used for work unit execution, such as a pointer to a function for execution by a specified one of processing cores 140. Other words in the work unit message may contain parameters to be passed to the function call, such as pointers to data in memory, parameter values, or other information used in executing the work unit.

In one example, receiving a work unit is signaled by receiving a message in a work unit receive queue (e.g., one of WU queues 143). The one of WU queues 143 is associated with a processing element, such as one of cores 140, and is addressable in the header of the work unit message. One of cores 140 may generate a work unit message by executing stored instructions to addresses mapped to a work unit transmit queue (e.g., another one of WU queues 143). The stored instructions write the contents of the message to the queue. The release of a work unit message may be interlocked with (gated by) flushing of the core's dirty cache data. Work units, including their structure and functionality, are described in more detail below.

In the example implementation illustrated in FIG. 2, DPU 130 includes a timer manager 145 that coordinates the numerous individual timers concurrently executing on DPU 130 using a waterfall architecture. As described herein, using the waterfall architecture, timer manager 145 may define and represent individual concurrent timers in terms of one or more cascading time intervals, thereby allowing timers of larger duration to be defined in terms of multiple, cascading smaller time intervals. The techniques may provide numerous technical advantages in terms of efficiency and reduction of computational and memory resources necessary to maintain high volumes of concurrent timers.

As such, timer manager 145 enables DPU 130 to implement large-scale, concurrent fine-grain timers necessary to support any one or any combination of critical functions, such as networking and storage stacks, such as network compliance, storage stack functionalities, error detection, error resilience/recovery, rate control, congestion management, state machine sequencing, keepalives, heartbeats, maintenance, garbage collection, coalescing, batching, time-based heuristics monitoring, etc. Using the techniques described herein, timer manager 145 may enable thousands or millions of timers to concurrently execute on DPU 130 while maintaining precision and scalability. Timer manager 145 coordinates and manages the timers of DPU 130, and, as further described, employs a waterfall architecture in which the duration for any given timer can be defined as a series of cascading smaller time intervals, in accordance with aspects of this disclosure.

As shown in FIG. 2, timer manager 145 is accessible by software functions executing on cores 140 and responsive to instructions received therefrom, such as creating, starting, stopping and signaling expiration of timers. That is, in some example implementations, timer manager 145 configures and manages timers in response to requests received from any of cores 140. For instance, timer manager 145 may expose a read/write interface via memory-mapped data regions available via memory controller 144, thereby operating and maintaining timers responsive to commands/requests received from software functions that are executing on cores 140 and operating on one or more work units from WU queues 143. In some example implementations, timer manager 145 signals timer events, such as expiration of a given timer, by pushing a new work unit in a work unit receive queue (e.g., one of WU queues 143). In general, timer manager 145 may be formed in one or more microprocessors, application specific integrated circuits (ASICs), such as a hardware ASIC, field programmable gate arrays (FPGAs), digital signal processors (DSPs), processing circuitry (including fixed function circuitry and/or programmable processing circuitry), or other equivalent integrated or discrete logic circuitry.

Figure 3:
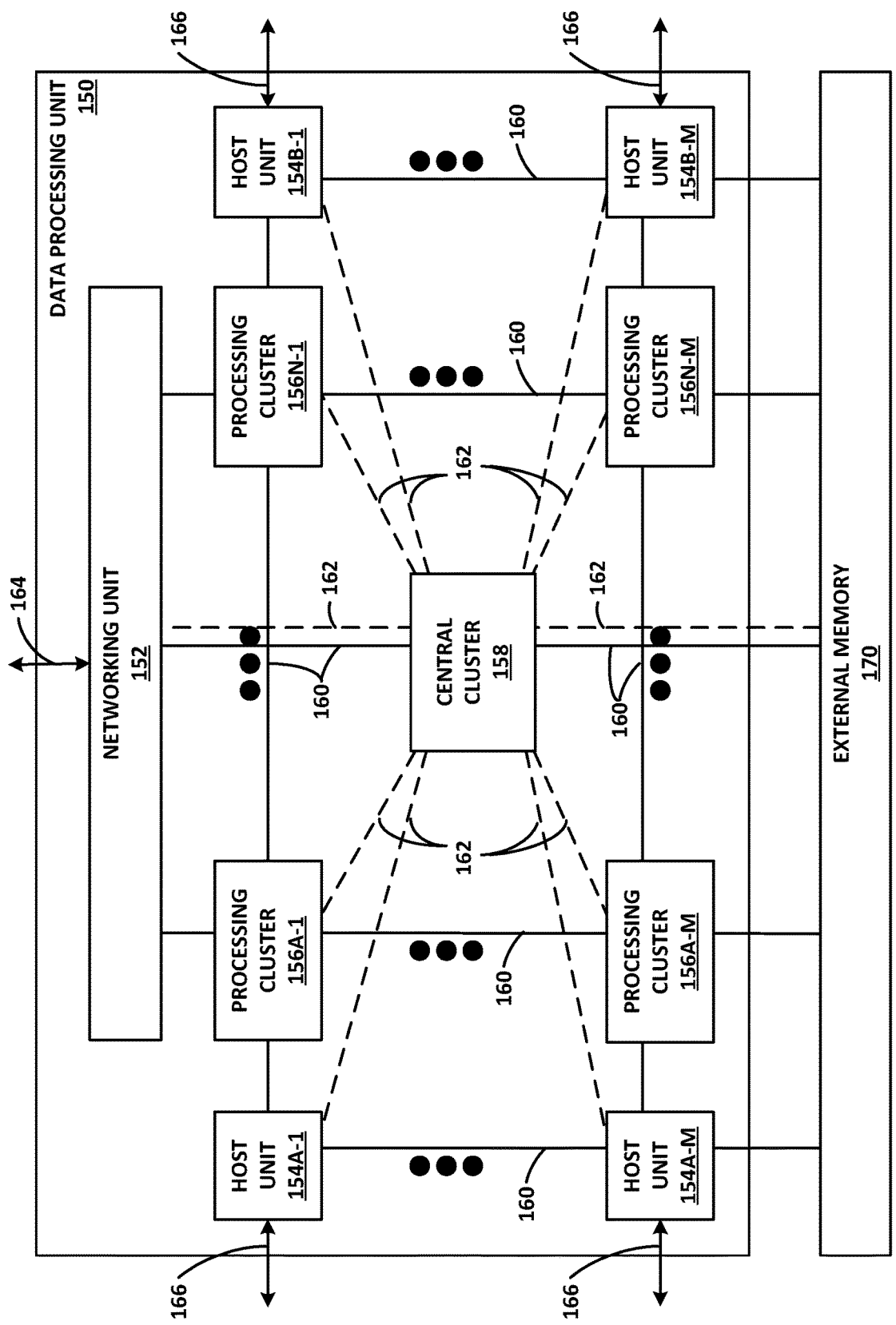
FIG. 3 is a block diagram illustrating another example data processing unit including two or more processing clusters, in accordance with aspects of this disclosure.

FIG. 3 is a block diagram illustrating another example of a data processing unit 150 including a networking unit, at least one host unit, and two or more processing clusters. Data processing unit 150 may operate substantially similar to any of the access nodes 17 of FIG. 1 and DPU 130 of FIG. 2. Thus, data processing unit 150 may be communicatively coupled to a data center fabric (e.g., switch fabric 14), one or more server devices (e.g., servers 12), storage media (e.g., SSDs), one or more network devices, random access memory, or the like, e.g., via PCI-e, Ethernet (wired or wireless), or other such communication media in order to interconnect each of these various elements. Data processing unit 150 generally represents a hardware chip implemented in digital logic circuitry. As various examples, data processing unit 150 may be provided as an integrated circuit mounted on a motherboard of a computing device or installed on a card connected to the motherboard of the computing device.

In this example implementation, data processing unit 150 represents a high performance, hyper-converged network, storage, and data processor and input/output hub. As illustrated in FIG. 3, data processing unit 150 includes networking unit 152, processing clusters 156A-1-156N-M (processing clusters 156), host units 154A-1-154B-M (host units 154), and central cluster 158, and is coupled to external memory 170. Each of host units 154, processing clusters 156, central cluster 158, and networking unit 152 may include a plurality of processing cores, e.g., MIPS cores, ARM cores, PowerPC cores, RISC-V cores, or CISC or x86 cores. External memory 170 may comprise random access memory (RAM) or dynamic random access memory (DRAM).

As shown in FIG. 3, host units 154, processing clusters 156, central cluster 158, networking unit 152, and external memory 170 are communicatively interconnected via one or more specialized network-on-chip fabrics. A set of direct links 162 (represented as dashed lines in FIG. 3) forms a signaling network fabric that directly connects central cluster 158 to each of the other components of data processing unit 150, that is, host units 154, processing clusters 156, networking unit 152, and external memory 170. A set of grid links 160 (represented as solid lines in FIG. 3) forms a data network fabric that connects neighboring components (including host units 154, processing clusters 156, networking unit 152, and external memory 170) to each other in a two-dimensional grid.

Host units 154 each have PCI-e interfaces 166 to connect to servers and/or storage devices, such as SSD devices. This allows data processing unit 150 to operate as an endpoint or as a root. For example, data processing unit 150 may connect to a host system (e.g., a server) as an endpoint device, and data processing unit 150 may connect as a root to endpoint devices (e.g., SSD devices).

Data processing unit 150 provides optimizations for stream processing. Data processing unit 150 executes an operating system that provides run-to-completion processing, which may eliminate interrupts, thread scheduling, cache thrashing, and associated costs. For example, an operating system may run on one or more of processing clusters 156. Central cluster 158 may be configured differently from processing clusters 156, which may be referred to as stream processing clusters. In general, central cluster 158 executes the operating system kernel (e.g., Linux kernel) as a control plane. Processing clusters 156 may function in run-to-completion thread mode of a data plane software stack of the operating system. That is, processing clusters 156 may operate in a tight loop fed by work unit queues associated with each processing core in a cooperative multi-tasking fashion.

As described above, work units are sets of data exchanged between processing clusters 156, networking unit 152, host units 154, central cluster 158, and external memory 170. Each work unit may represent a fixed length data structure including an action value and one or more arguments. In one example, a work unit includes four words, a first word having a value representing an action value and three additional words each representing an argument. The action value may be considered a work unit header containing information necessary for message delivery and information used for work unit execution, such as a work unit handler identifier, and source and destination identifiers of the work unit. The other arguments of the work unit data structure may include a frame argument having a value acting as a pointer to a continuation work unit to invoke a subsequent work unit handler, a flow argument having a value acting as a pointer to state that is relevant to the work unit handler, and a packet argument having a value acting as a packet pointer for packet and/or block processing handlers. See, for example, FIGS. 6A and 6B as example implementations.

As described herein, one or more processing cores of processing clusters 180 may be configured to execute program instructions using a work unit (WU) stack. In general, a work unit (WU) stack is a data structure to help manage event driven, run-to-completion programming model of an operating system typically executed by processing clusters 156 of data processing unit 150. An event driven model typically generally means that state, which might otherwise be stored as function local variables, is stored as state outside the programming language stack. Moreover, the run-to-completion model of the underlying operating system also implies that programs would otherwise be forced to dissect software functions to insert yield points to pause execution of the functions and ensure that events are properly serviced. Instead of having to rely on such cumbersome techniques, the work unit stack described herein may enable use familiar programming constructs (call/return, call/continue, long-lived stack-based variables) within the event-driven execution model provided by the underlying operating system of data processing unit 150 without necessarily having to resort relying on cumbersome yield points. Moreover, the configuration and arrangement of the WU stack separate from the program stack maintained by the operating system allows execution according to a program stack to easily flow between processing cores, thereby facilitating high-speed, event-driven processing, such as stream processing, even using a run-to-completion model provided by an underlying operating system.

In the example implementation illustrated in FIG. 3, each processing cluster 156 of DPU 150 includes a timer manager (not shown) that coordinates the numerous individual timers concurrently executing on DPU 150 using a waterfall architecture in which individual concurrent timers are defined and represented in terms of one or more cascading time intervals, thereby allowing timers of larger duration to be defined in terms of multiple, cascading smaller time intervals. Each timer manager may, for example, operate similar to timer manager 145 (FIG. 2) to implement the techniques described herein. As such, the timer managers of processing clusters 156 enable DPU 150 to implement large-scale, concurrent fine-grain timers necessary to support any one or any combination of data processing functions. Using the techniques described herein, the timer managers may enable thousands or millions of timers to concurrently execute on DPU 150 for supporting software and hardware functions of processing clusters 156 while maintaining timing precision and scalability.

Figure 4:
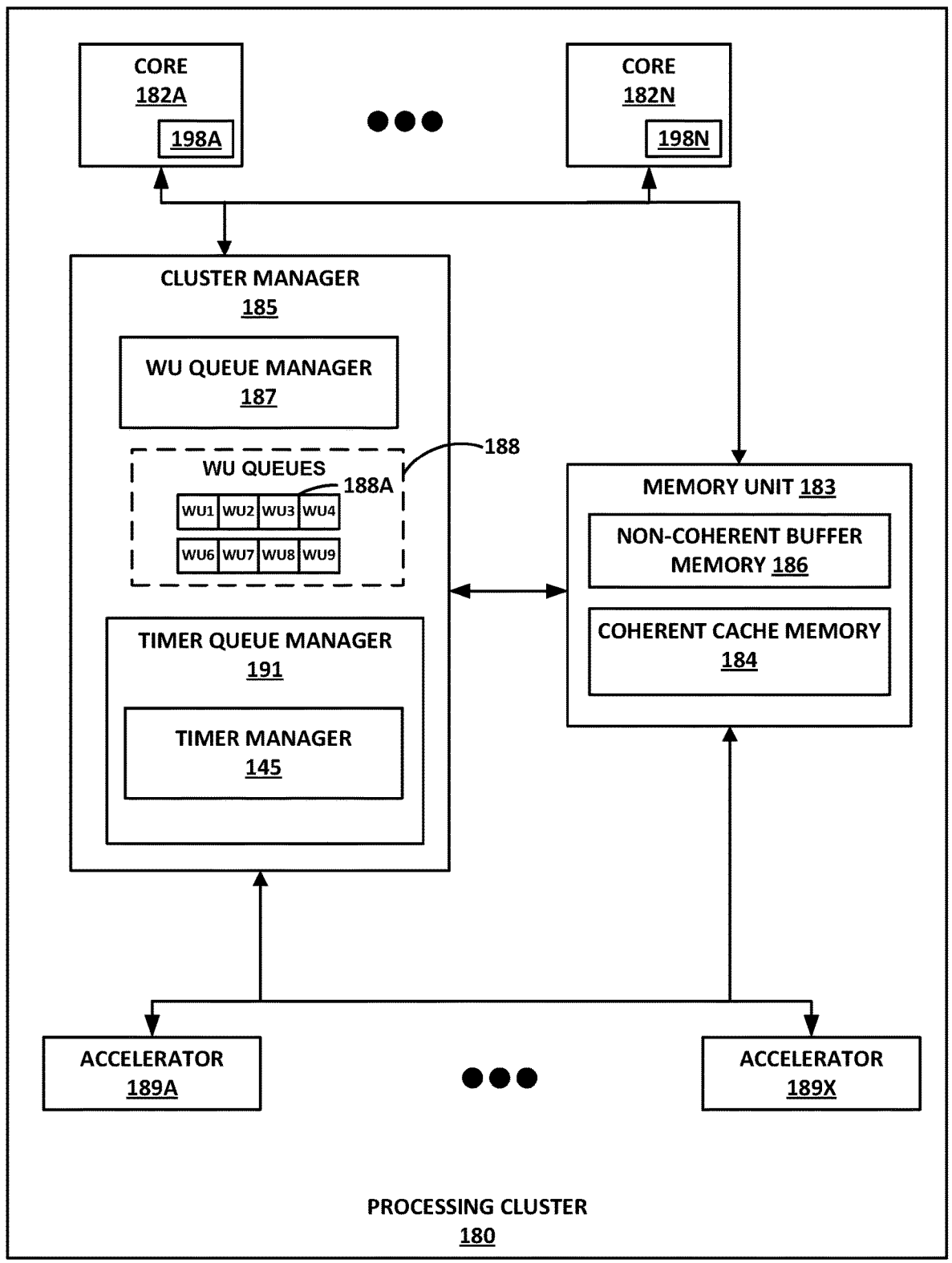
FIG. 4 is a block diagram illustrating an example processing cluster including a plurality of programmable processing cores, in accordance with aspects of this disclosure.

FIG. 4 is a block diagram illustrating a more detailed example of a processing cluster 180 including a plurality of programmable processing cores 182A-182N. Each of processing clusters 156 of DPU 150 of FIG. 3 may be configured in a manner substantially similar to that shown in FIG. 4. In the example of FIG. 4, processing cluster 180 includes cores 182A-182N ("cores 182"), a memory unit 183 including a coherent cache memory 184 and a non-coherent buffer memory 186, a cluster manager 185 including WU queue manager 187 for maintaining (e.g., within hardware registers of processing cluster 180) and manipulating WU queues 188, and accelerators 189A-189X ("accelerators 189"). Each of cores 182 includes L1 buffer cache 198 (i.e., core 182 includes L1 buffer cache 198A and in general, core 182N includes L1 buffer cache 198N). In some examples, cluster manager 185 is alternatively located within central cluster 158, and/or WU queues 188 are alternatively maintained within central cluster 158 (e.g., within hardware registers of central cluster 158).

An access node or DPU (such as access nodes 17 of FIG. 1, DPU 130 of FIG. 2, or DPU 150 of FIG. 3) may support two distinct memory systems: a coherent memory system and a non-coherent buffer memory system. In the example of FIG. 4, coherent cache memory 184 represents part of the coherent memory system while non-coherent buffer memory 186 represents part of the non-coherent buffer memory system. Cores 182 may represent the processing cores discussed with respect to DPU 150 of FIG. 3. Cores 182 may share non-coherent buffer memory 186. As one example, cores 182 may use non-coherent buffer memory 186 for sharing streaming data, such as network packets.

In general, accelerators 189 perform acceleration for various data-processing functions, such as table lookups, matrix multiplication, cryptography, compression, regular expressions, or the like. That is, accelerators 189 may comprise hardware implementations of lookup engines, matrix multipliers, cryptographic engines, compression engines, regular expression interpreters, or the like. For example, accelerators 189 may include a lookup engine that performs hash table lookups in hardware to provide a high lookup rate. The lookup engine may be invoked through work units from external interfaces and virtual processors of cores 182, and generates lookup notifications through work units. Accelerators 189 may also include one or more cryptographic units to support various cryptographic processes. Accelerators 189 may also include one or more compression units to perform compression and/or decompression.

An example process by which a processing cluster 180 processes a work unit is described here. Initially, cluster manager 185 of processing cluster 180 may queue a work unit (WU) in a hardware queue of WU queues 188. When cluster manager 185 "pops" the work unit from the hardware queue of WU queues 188, cluster manager 185 delivers the work unit to one of accelerators 189, e.g., a lookup engine. The accelerator 189 to which the work unit is delivered processes the work unit and determines that the work unit completion is to be delivered to one of cores 182 (in particular, core 182A, in this example) of processing cluster 180. Thus, the one of accelerators 189 forwards the work unit to a local switch of the signaling network on the DPU, which forwards the work unit to be queued in a virtual processor queue of WU queues 188.

In accordance with implementations consistent with aspects of this disclosure, processing cluster 180 includes a timer manager 191, as shown in FIG. 4. Timer manager 191 may be formed in one or more microprocessors, application specific integrated circuits (ASICs) such as a hardware ASIC, field programmable gate arrays (FPGAs), digital signal processors (DSPs), processing circuitry (including fixed function circuitry and/or programmable processing circuitry), or other equivalent integrated or discrete logic circuitry. Timer manager 191 includes the timer queue manager 145 illustrated in FIG. 2 and described above. Processing cluster 180 may rely on timers to support various functionalities.

Non-limiting examples of timers that processing cluster 180 executes to support various functionalities are listed and briefly described in Table 1 below:

TABLE 1

Timer Examples

| Timer | Range |
|---|---|
| TCP Retransmit | 10 μsec-10 sec |
| TCP Delayed Acknowledgment | 10 msec-100 msec |
| TCP Push | |
| TCP Persist | 10 μsec-10 sec |
| TCP Keepalive | Seconds-Minutes |
| TCP Timewait | |
| TCP Finwait2 | |
| DMA Interrupt Coalescing | 1 μsec-100 μsec |
| Storage I/O | 10 msec-10 sec |
| Traffic Pacing | 10 μsec-10 msec |

As shown in Table 1 above, processing cluster 180 executes numerous timers with a variety of expiration times (or ranges thereof) to support functionalities pertaining to stateful transport protocols and storage protocols. Table 1 above includes a limited set of timer examples that may be used in a data center, for the sake of brevity. Stateful transport protocols may cause processing cluster 180 to implement tens of thousands, or potentially, hundreds of thousands of timers for active connections, and some timers for inactive connections, as well. As shown in Table 1, processing cluster 180 implements timers to support flow monitoring capabilities and for input/output capabilities (I/Os), such as storage I/Os, collecting and maintaining heuristics for efficient processing, traffic management (which is typically associated with shorter timers), etc.

Different components of processing cluster 180 may require different timers. In the case of certain timers, cores 182 of processing cluster 180, for example, may execute software that requires allocation, start, and/or cancellation of timers by interaction with timer manager 145, which is implemented in hardware. In many use case scenarios, software executing on cores 182 may, for example, require various timers that stop in response to predefined time-based expiry (e.g., as illustrated in the 'Range' column of Table 1 above), without processing cluster 180 needing to cancel the timer via software-based preemption. Each instance of timer expiry is typically associated with a respective WU of WUs 188A, which is dequeued upon expiration of the timer for processing one or more events. In contrast to the event of timer expiry, the events of timer allocation, start, and cancellation are represented by "native messages" which are exchanged with the timer manager, and have a relatively small data size. The native messages that represent timer allocation, timer start, and timer cancellation events are generally sent as point-to-point communications between cores 182 and a cluster messaging hub (CMH) instantiated within processing cluster 180.

Timer manager 145 is configured to accept messages (such as an "start timer" message). Messages sent to timer manager 145 use a timer ID to identify a particular timer. For example, a "start timer" message can specify a WU stack pointer, which from the point of view of the timer manager, is an opaque value that is returned by timer manager 145 upon timer expiry in a timer expiry notification WU, and a timer handler index that timer manager 145 can map to a handler pointer. The opaque value can thus represent a memory address, pointing to data ("flow state") in memory unit 183, and the handler pointer refers to instructions executed by the cores 182 to process the timer expiry WU.

In accordance with aspects of this disclosure, timer manager 145 implements a number of circular timer queues or "wheels," and performs queue traversal of each respective timer according to a waterfall structure. The waterfall structure-based queue traversal described herein enables timer manager 145 to process a high number of timers while allowing a high level of timer precision, but with a reduced number of access operations (cycles) with respect to memory unit 183 and/or cores 182. As described above, starting a timer is a message-based operation. Messages, such as the message used to start a timer, are relatively cheap, in terms of computing resource consumption. For instance, cores 182 can generate such a message by executing a relatively small number of store instructions.

While the timer cancellation message requires a response from the timer manager 145, the start and allocation messages are asynchronous messages. That is, cores 182 do not require a response from timer manager 145 to determine whether or not a start message or allocation message was successful in starting or allocating (as the case may be) the respective timer. In the case of the cancellation message, the response received from timer manager 145 indicates to cores 182 whether the cancellation succeeded or failed with respect to the timer. If cores 182 receive a response indicating that the timer cancellation failed, then the contingency operation is to wait for the timer expiry notification WU to be arrive. The response for the cancellation message (also referred to as a "safe cancel timer" message) enables cores 182 to determine, among others, the viability of deleting (freeing) the "flow state" with which the cancelled timer was associated.

Figure 5:
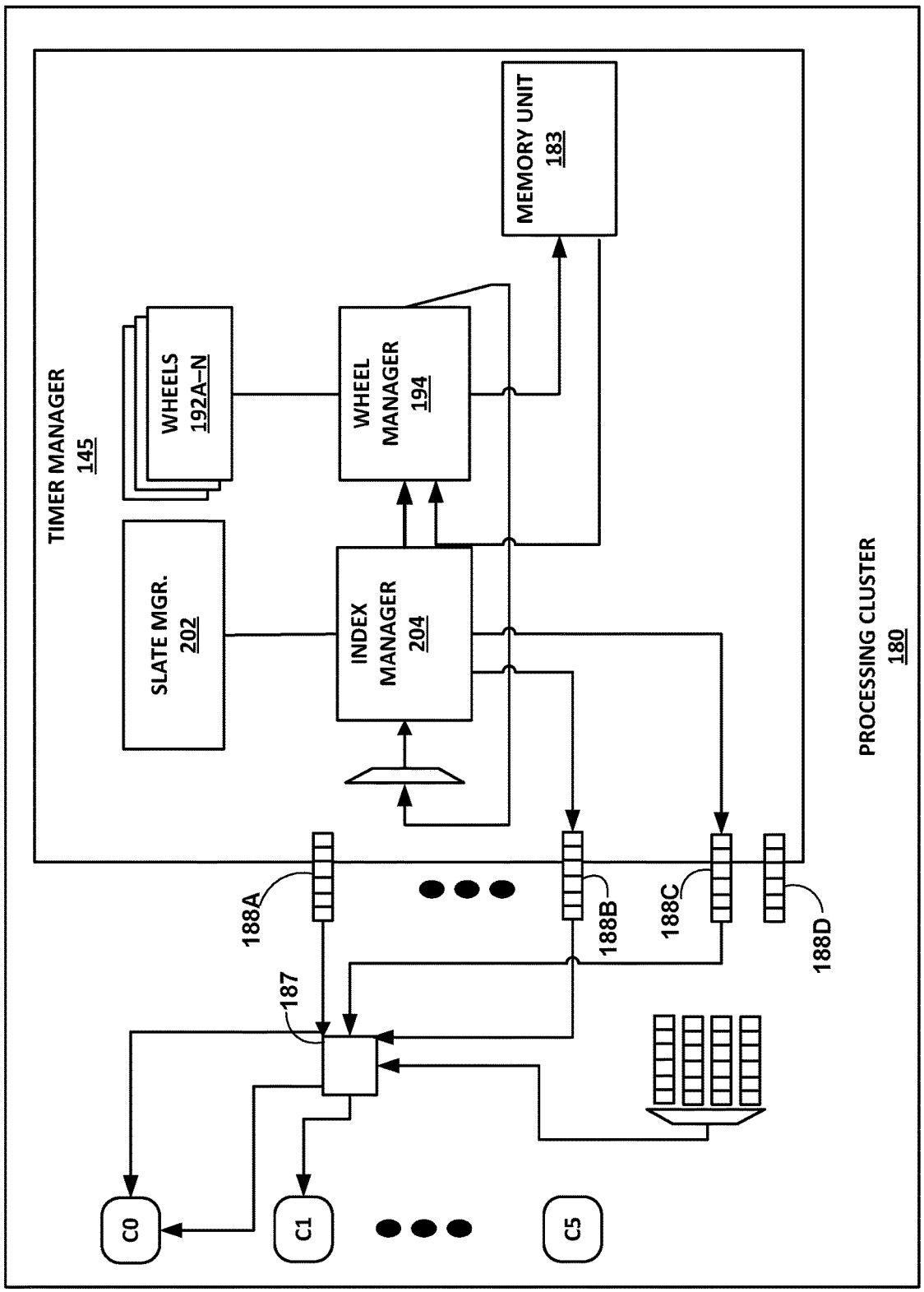
FIG. 5 is a block diagram illustrating further details of the processing cluster of FIG. 4.

FIG. 5 is a block diagram illustrating further details of one example implementation of processing cluster 180 of FIG. 4. In the example implementation illustrated in FIG. 5, timer manager 145 includes wheels 192, a wheel manager 194, a state manager 202, and index manager 204. Also, in the example of FIG. 5, memory unit 183 is shown within timer manager 145, although it will be appreciated that timer manager 145 can be implemented separately from memory 183 in various instances, such as the example illustrated in FIG. 4.

Wheels 192 represent a series of internal, hardware-based queues that collectively form traversal a traversal path for individual timers, such as the example timers discussed above with respect to Table 1. In various examples the number of wheels 192 varies. Each timer is placed an individual wheel 192 for a certain period of time configured on a per-wheel basis, before graduating from (e.g., being removed from the frontmost slot) of the respective wheel 192, and then being placed at the end (e.g., backmost slot) of the next wheel 192 of the traversal path. In this way, each concurrent timer may be defined in terms of one or more cascading time intervals, referred to as wheels, thereby allowing timers of larger duration to be defined in terms of multiple, cascading, smaller time intervals. This architecture is further described below and may also be referred to herein as a "waterfall architecture."

Wheel manager 194 of timer manager 145 may be formed in one or more microprocessors, application specific integrated circuits (ASICs) such as a hardware ASIC, field programmable gate arrays (FPGAs), digital signal processors (DSPs), processing circuitry (including fixed function circuitry and/or programmable processing circuitry), or other equivalent integrated or discrete logic circuitry. Wheel manager 194 is configured to coordinate the traversal of each individual timer through wheels 192. Wheel manager 194 identifies each timer using an individual timer ID. The timer ID assigned to each timer is represented by an index to a table entry. Index manager 204 is configured to determine the individual timer state for a respective timer ID currently being processed, and provide the individual timer state to wheel manager 194.

Timer manager 145 may maintain a number of timers (e.g., 256K timers, representing a value of 256×1024 timers) in a prefetch queue. Index manager 204 uses the corresponding index in a state table for a particular timer as the timer ID for that particular timer. In the example of 256K timers given above, the maximum timer ID value that index manager 204 processes from the state table is 256K-1. State manager 202 maintains per-timer state information, including a "Timer State" that is managed according to a state machine illustrated in FIG. 7 and described below.

With respect to the example of FIG. 5, four of WU queues 188 are illustrated and described as "timer queues 188A-188D." WU queue manager 187 functions as an arbiter of timer expiry work units for execution by cores (called out using index values C0-C5) illustrated in FIG. 5. In the particular use-case scenario illustrated in FIG. 5, each of cores C0-C5 is associated with four timer queues. More specifically, in the illustrated use case, core C0 is associated with timer queues 188A-188D. As such, in the example of FIG. 5, timer manager 145 manages a total of twenty-four (24) timers across cores C0-C5. As one example, upon generating a work unit notification denoting handling of a timer expiry, timer manager 145 deallocates the corresponding timer state by marking the state as "FREE." Again, in one example, only a timer expiry event is indicated by a work unit notification while, in contrast, each of timer allocation, start, and cancellation events may be represented by light weight messages. For instance, a timer "allocate" message causes timer manager 145 to push a new timer to the corresponding core timer prefetch queue.

Figure 6A:
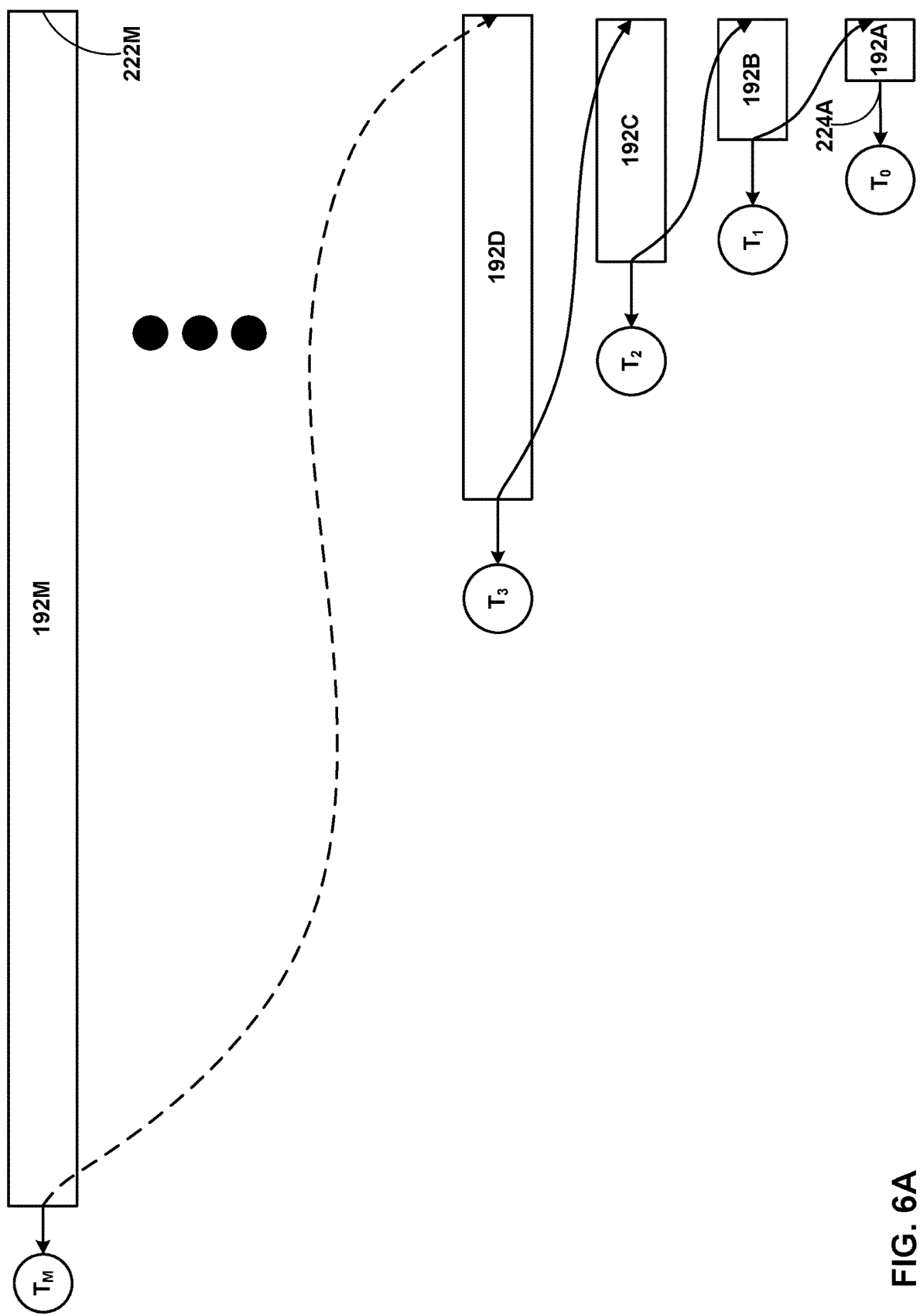
FIGS. 6A and 6B are conceptual diagrams illustrating aspects of the waterfall-structured wheel traversal (or queue traversal) of this disclosure.
Figure 6B:
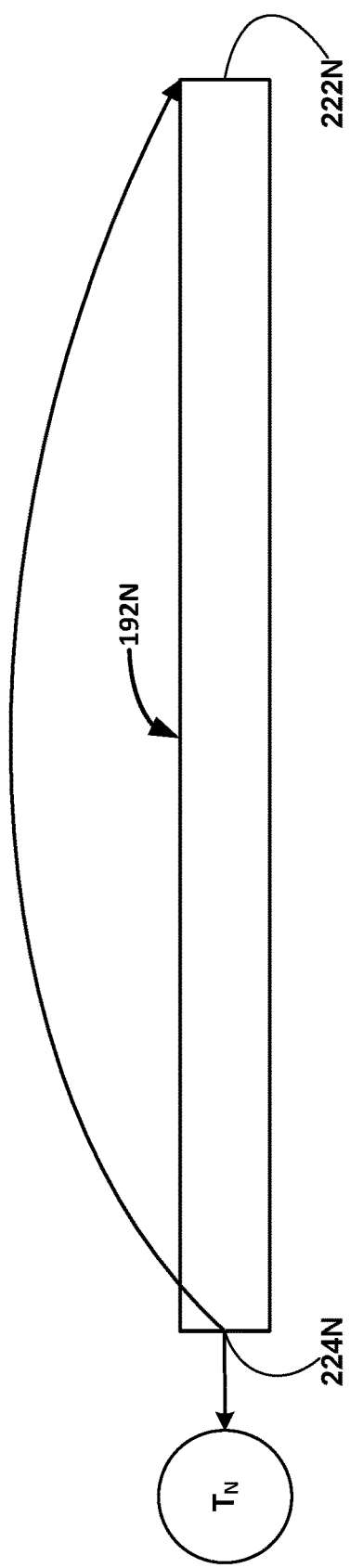

FIGS. 6A and 6B are conceptual diagrams illustrating aspects of the waterfall-structured wheel traversal (or queue traversal) of this disclosure. In various use-case scenarios, the set of wheels 192 of FIG. 5 may include a total of fourteen (14), sixteen (16), twenty (20), or a different number of wheels representing time durations that can be collectively utilized to form the traversal path (overall time duration) of an individual timer. In the example of FIG. 6A, wheels 192A-192M represent consecutive queues of the overall traversal path of a given timer, as described herein.

Discussed with respect to the traversal path illustrated in FIG. 6A, wheel manager 194 first places a timer at tail position 222M of wheel 192M. Wheel 192M may be viewed as a queue that concurrently serves multiple timers, in a first-in-first-out (FIFO) order in accordance with a time interval precisely associated with wheels 192A-D and others in accordance with queue structures. After being processed in FIFO order in wheel 192M, the timer advances to a head position of wheel 192M. At time $T_M$, wheel manager 194 removes the timer from wheel 192M. At time $T_M$, the timer would have spent a finite time period (or delay) denoted by DM in wheel 192M. In some examples, the delay DM represents a value of $2^M$ microseconds (pec), where 'M' represents a constant associated with the individual wheel 192A.

Wheel 192D represents a subsequent wheel (in time, i.e., in chronological order) with respect to wheel 192M, along the traversal path determined by wheel manager 194 for the particular timer. It will be appreciated that wheel 192D may be immediately subsequent to wheels 192M along the traversal path, or other wheels may be positioned between wheels 192M and 192D along the traversal path, in various use case scenarios. The dashed-line transition from wheel 192M to wheel 192D indicates the possible variation between whether any wheels are positioned between wheel 192M and 192D. Moreover, if any of wheels 192 are positioned between wheels 192M and 192D along the traversal path, the number of intervening wheels may vary, in accordance with aspects of this disclosure illustrated in FIG. 6A.

Upon removing the timer from the head position of wheel 192M, and thereby from wheel 192M, wheel manager 194 places the timer at the tail position of the next lower wheel, and upon removal of the timer therefrom, at the tail position next lower wheel still, and so on. In the example of FIG. 6A, wheel manager 194 causes the timer to traverse any intervening wheels between wheel 192M and 192D, then through wheel 192C, and then through wheel 192B. In the example of FIG. 6A, wheel manager 194 causes the timer to traverse wheel 192A. That is, after the timer graduates from all of wheels 192M-192B, timer manager 194 places the timer at the tail position of wheel 192A.

After the timer fulfills, in FIFO order, the delay of wheel 192A (e.g., 2^0=1 millisecond), the timer reaches, and is removed from, head position 224A of wheel 192A.

Described generically, each of wheels 192 provides a respective fixed delay $D_w$ which, in examples, represents a time period of $2^W$ μsec, where the superscript 'W' represents a constant associated with the respective individual wheel 192. A simple implementation is to assign W to be the index of individual wheel 192 within the waterfall structure. Cumulatively, the summation of the $D_w$ values for the entire traversal path for a given timer defines the total amount of time that the timer spends in wheel traversal, i.e., traversing the sequential levels of the waterfall architecture.

For each of wheels 192, wheel manager 194 assigns a respective inspection time. The inspection time $T_{insp}$ for a given wheel "w" is given by the following equation:

$$T_{insp} = WCT + D_w$$

In equation (1) above, the variable 'WCT' represents "wall clock time" which in turn represents the time at which the time is added to a particular wheel 192. $D_w$ represents the delay that wheel manager 194 sets for the particular wheel 192. As such, $T_{insp}$ represents the time at which the timer is removed from the particular wheel 192.

FIG. 6B illustrates an alternate traversal aspect of this disclosure. The alternative traversal of FIG. 6B is illustrated with respect to the traversal of a timer through a single queue, namely, wheel 192C of wheels 192. In the example of FIG. 6B, timer manager 145 may determine that wheel 192C is a faster wheel than one or more of the remaining wheels 192. That is, the $T_{insp}$ value set for wheel 192C may be less than the $T_{insp}$ value set for another one of wheels 192 by wheel manager 194. In this example, timer manager 145 may, in accordance with some aspects of this disclosure, leverage the lower $T_{insp}$ value of wheel 192C by causing the timer to traverse wheel 192C multiple times, while skipping one or more slower wheels of wheels 192. In this way, according to certain aspects of this disclosure, timer manager 145 may avail of individual wheels (such as wheel 192C in the example of FIG. 6B) that have shorter traversal times to substitute for traversals through individual wheels having greater traversal times.

Figure 7A:
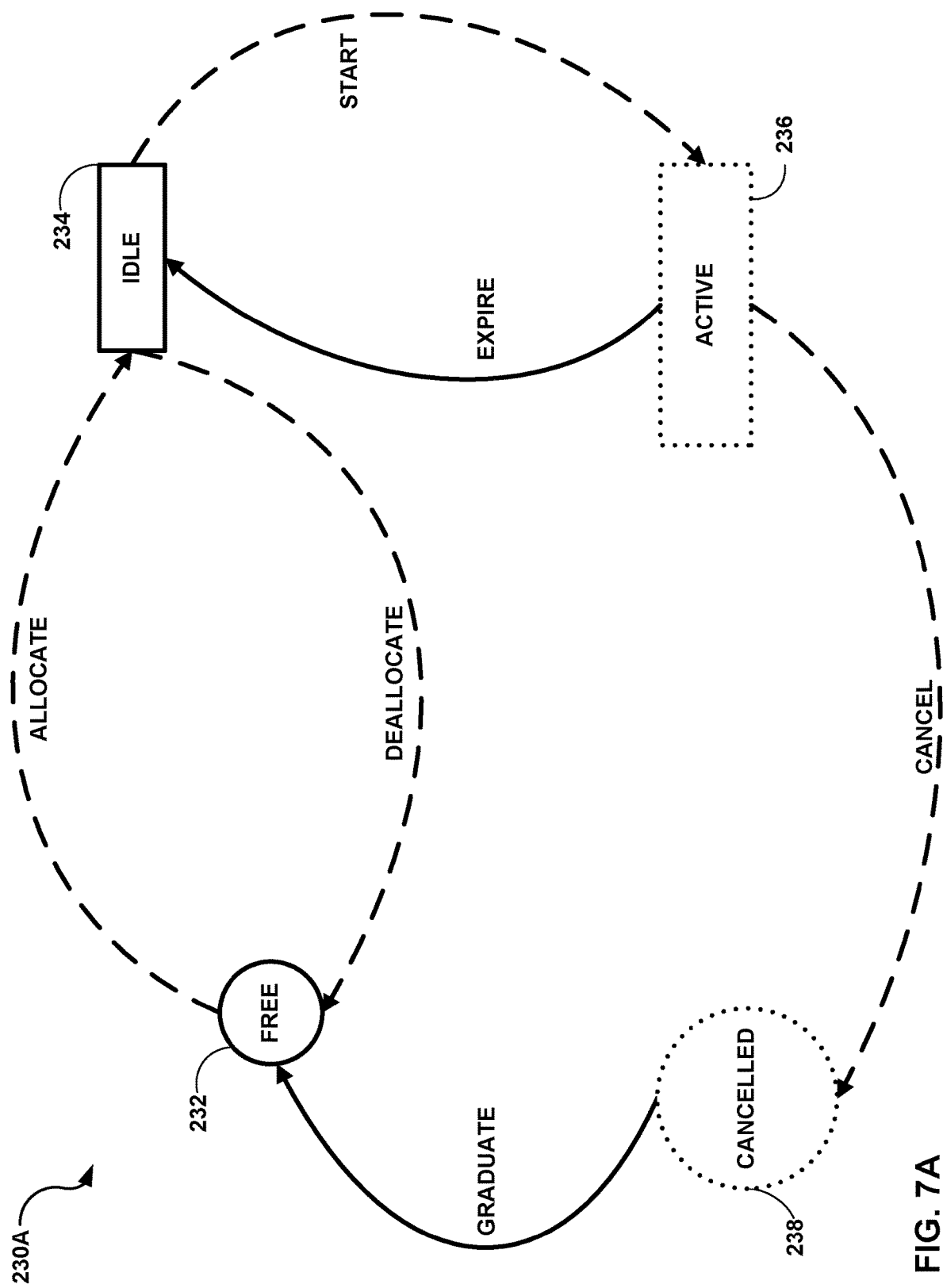
FIGS. 7A and 7B are state diagrams illustrating timer state machines that represent various state transitions that a timer may traverse, in accordance with aspects of this disclosure.
Figure 7B:
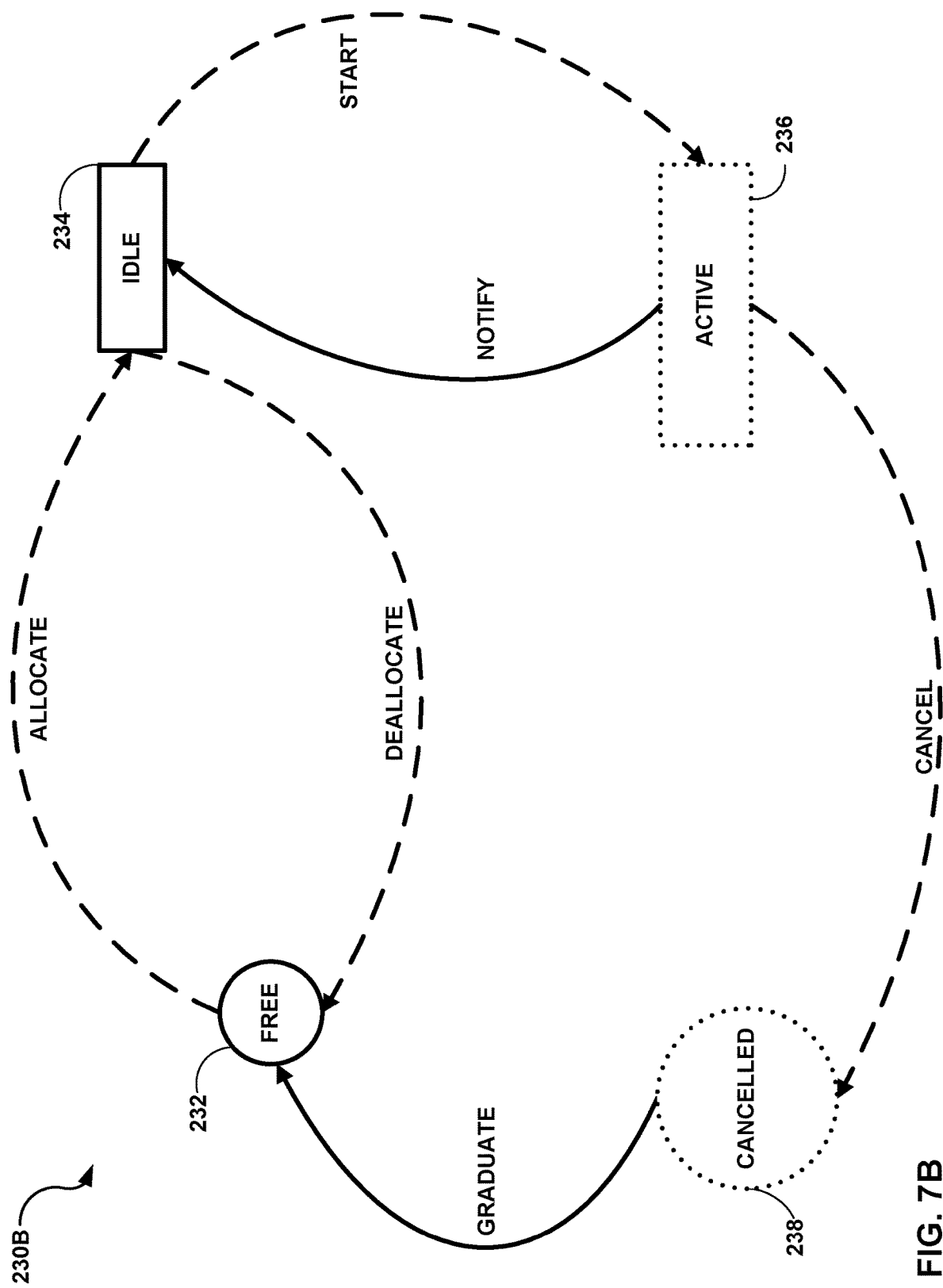

FIGS. 7A and 7B are state diagrams illustrating timer state machines 230A and 230B that represent various state transitions that a timer may traverse, in accordance with aspects of this disclosure. State transitions illustrated using solid lines in timer state machines 230A and 230B of FIGS. 7A and 7B represent transitions in which the timer ID is "owned" by timer manager 145. State transitions illustrated using dashed lines in timer state machines 230A and 230B of FIGS. 7A and 7B represent transitions in which the timer ID is owned by software executing on DPU 150. As such, the solid-line transitions in FIGS. 7A and 7B represent hardware operations, while dashed-line transitions in FIGS. 7A and 7B represent software operations.

In FIGS. 7A and 7B, circular state indicators represent states in which the timer ID is owned by timer manager 145, while rectangular state indicators represent states in which the timer ID is owned by the software executing on DPU 150. As such, the circular state indicators in FIGS. 7A and 7B represent hardware-operated states, while rectangular state indicators in FIGS. 7A and 7B represent software-operated states. States depicted in FIGS. 7A and 7B using solid-lined borders represent states in which the corresponding timer is not currently placed in a queue (i.e. not placed in any of wheels 192), while states depicted in FIGS. 7A and 7B using dotted-lined borders represent states in which the corresponding timer is currently placed in a queue (i.e. is currently placed in one of wheels 192).

In the example use case described with respect to FIG. 7A, timer state machine 230A starts with the timer in free state 232. Timer manager 145 may generate an "allocate" message to transition the timer from free state 232 to idle state 234. That is, when allocated, the timer state is set to idle state 234. Based on timer manager 145 generating the "allocate" message, index manager 204 sends the timer ID to the respective core of cores C0-C5. In turn, software executing on processing cluster 180 may read the timer ID provided by index manager 204, and in response, allocate the timer. In one use-case scenario, the software executing on processing cluster 180 generates a "deallocate" message with respect to the idle timer, thereby reverting the timer to free state 232, and enabling processing cluster 180 to allocate another timer.

In another use-case scenario, the software executing on processing cluster 180 triggers a "start" message. The "start" message includes an opaque value that may represent a pointer to a location in memory unit 183, and also includes information indicating the timeout length (e.g., time duration until expiry) of the timer. In response to the generation of "start" message, timer manager 145 places the timer into the queueing system, such as at the tail of the first of wheels 192 along the timer's traversal path. Based on the "start" message and the resulting placement of the timer into the queueing system, the timer manager places the timer in active state 236.

The timer may exit active state 236 in one of two ways. In one scenario, the timer remains active through the preset time duration, causing timer manager 145 to trigger an "expire" message. Based on the preset time having elapsed, and based on the "expire" notification message (e.g. a timer expiry WU) being generated, timer manager 145 returns the timer to idle state 234. As shown in FIG. 7A, the timer may toggle between idle state 234 and active state 236 based on "start" messages generated by the software executing on processing cluster 180 and "expire" notification messages generated by timer manager 145.

Another way in which the timer can exit active state 236 is in response to a "cancel" message generated by the software executing on processing cluster 180. The software executing on processing cluster 180 can cancel the timer, if the software traps the timer for cancellation prior to the time-based expiry, which would cause timer manager 145 to transition the timer state to the cancelled state 238. The timer, once in cancelled state 238, can graduate from the queue (i.e., the current one of wheels 192), causing timer manager 145 to return the timer to free state 232. The overall process represented by timer state machine 230A can be described as the timer being "recycled" into free state 232 upon graduating from one of wheels 192.

Timer state machine 230B of FIG. 7B represents a similar workflow to timer state machine 230A of FIG. 7A, but with different stimuli with respect to certain state transitions. More specifically, in the example of timer state machine 230B, any transitions that may occur from active state 236 to idle state 234 are in response to a "notify" message. As shown by the solid line illustrating the transition from active state 236 back to idle state 234, the "notify" message is hardware-generated. For instance, timer manager 145 generates the "notify" message that instigates any transition that may occur from active state 236 back to idle state 234.

Figure 8:
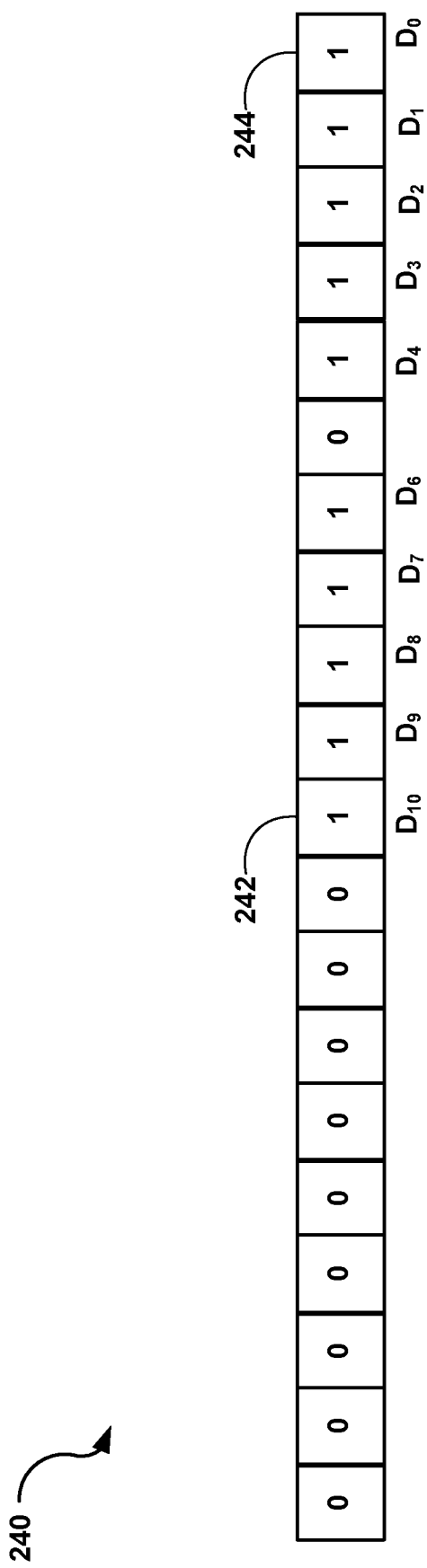
FIG. 8 is a conceptual diagram illustrating an example timer traversal path of this disclosure.

FIG. 8 is a conceptual diagram illustrating a data structure defined by timer manager 145 to specify an example timer traversal path for a given timer. Timer manager 145 is configured to generate bit vectors or bitmasks (bitmask 240 being one non-limiting example) by converting a predetermined timer traversal time (expressed as a decimal number of microseconds) to binary format. In turn, wheel manager 194 is configured to form the traversal path by selecting the individual wheels 192 that map to '1' value bits of the binary bitmask that timer manager 145 obtained for the particular timer.

FIG. 8 illustrates an example bitmask (or bit vector or bitmap) 240 defining a total timer traversal time of 2,015 microseconds. Encoded in hexadecimal ("hex") format, bitmask 240 represents a value of 7DF (or 0x7DF). The encoded traversal time represents a rounded-up value with respect to the actual traversal time. As such, bitmask 240 represents a binary encoding of the total traversal time of 2,015 microseconds. In the example of FIG. 8, bits set to a '1' value identify wheels that wheel manager 194 includes in the timer's waterfall-structured traversal path, while bits set to a '0' value identify wheels that timer manager 145 excludes from the timer's waterfall-structured traversal path. In accordance with the waterfall structure of this disclosure, timer manager 145 places the timer in the slowest wheel of the selected wheels first, and then moves the timer through the remaining selected wheels in ascending order of speed (descending order of time delay). As such, bitmask 240 illustrates a scenario in which timer manager 145 determines a waterfall-based traversal path in which wheel ten is the slowest wheel that the timer traverses, and wheel zero is the fastest wheel that the timer traverses.

More specifically, in the example of bitmask 240, most significant bit 242 represents wheel ten (10) of the timer's traversal path, while least significant bit 244 represents wheel zero (0) of the timer's traversal path. In the example of bitmask 240, timer manager 145 forms the waterfall-based traversal path as being, in sequential order, wheels ten (10), nine (9), eight (8), seven (7), six (6), four (4), three (3), two (2), one (1), and zero (0). The wheels selected for the waterfall-based traversal are identified by the significant bits illustrated in bitmask 240. The time delays of the wheels selected for the traversal path are illustrated in FIG. 8, namely, $D_0$-$D_4$ and $D_6$-$D_{10}$. The sum of the time delays represented by $D_0$-$D_4$ and $D_6$-$D_{10}$ amounts to 2,015 microseconds, according to the calculations described above.

After the timer graduates from a particular wheel, timer manager 145 shifts bitmask 240 to the left, in order to identify the next wheel in which to place the timer. For instance, timer manager 145 shifts bitmask 240 to the left by a number of bits required to reach the next significant bit, in descending order. That is, timer manager 145 shifts bitmask 240 to the left in order to identify the next wheel that is selected for the waterfall-structured traversal plan. In the case of FIG. 8, after the timer graduates from wheel ten (10), timer manager 145 shifts bitmask 240 to the left by one bit, because the next significant bit in descending order is associated with wheel nine (9). In an (unillustrated) example of a 1503 millisecond (hex 0x5DF) traversal plan, timer manager 145 may left-shift bitmask 240 by two bits after the timer graduates from wheel ten (10). This is because, in the 1503 millisecond scenario, wheel nine (9) would be skipped and marked with a '0' value bit, while wheel eight (8) would be included in the traversal path, and would be identified with a significant bit. Similarly, in the case of bitmask 240, timer manager 145 performs a two-bit left shift after the timer graduates from wheel six (6), because wheel five (5) is skipped (as shown by the corresponding '0' value bit), but wheel four (4) is included in the traversal plan (as shown by the corresponding significant bit).

In one example, each wheel represented by a respective bit in bitmask 240 is twice as fast as the previous wheel. Said another way, each wheel provides half of the time delay in comparison to the wheel positioned immediately above it along the waterfall-based traversal path. More specifically, each respective bit represents a wheel that is twice as fast as the wheel represented by the bit immediately to the respective bit. For instance, wheel ten (10), which maps to most significant bit 242, is twice as fast as wheel eleven (11) represented by the '0' value bit positioned immediately to the left of most significant bit 242 in bitmask 240. Similarly, wheel nine (9), represented by the significant bit positioned immediately to the right of most significant bit 242 is twice as fast as wheel ten (10), and so on. That is, $D_9$ is half the value of $D_{10}$, $D_8$ is half the value of $D_9$, and so on.

The relative wheel speeds are described in the example above as increasing by a factor of two (2) while navigating in a rightward (decreasing) order along bitmask 240. Expressed using the speeds' inversely proportional unit of time delay, each respective bit of bitmask 240 represents a wheel that has double the time delay of the wheel represented by the bit positioned immediately to the right of the respective bit. For instance, wheel ten (10), which maps to most significant bit 242, provides double the time delay (or timeout or "TO") as wheel nine (9), represented by the significant bit positioned immediately to the right of most significant bit 242 in bitmask 240. Similarly, wheel eleven (11) represented by the '0' value bit positioned immediately to the left of most significant bit 242, provides double the time delay (or timeout or "TO") as wheel ten (10), and so on. Again, $D_9$ is half the value of $D_{10}$, $D_8$ is half the value of $D_9$, and so on.

Because, in this example, wheels 192 sequentially progress by a factor of two (2), whether expressed with respect to time delay or speed, timer manager 145 encodes the overall traversal time in binary format. That is, in generating bitmask 240, timer manager 145 leverages the characteristic of binary notation being based on populating bits at powers of two (2) to represent a sequence of selected wheels 192, which progress by factors of two (2) in terms of speed or time delay.

Figure 9A:
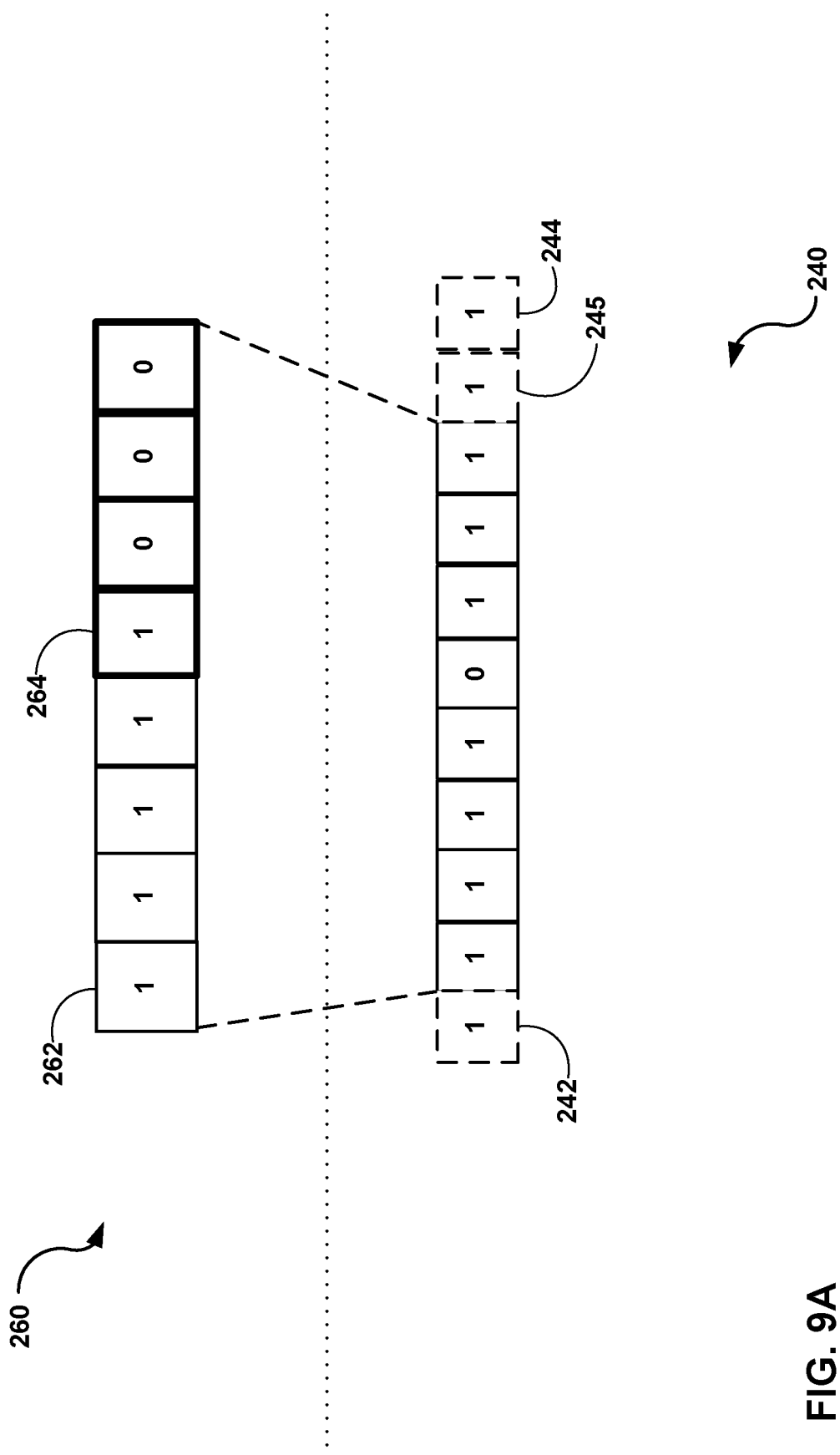
FIGS. 9A and 9B are conceptual diagrams illustrating examples of altered timer traversal paths of this disclosure.
Figure 9B:
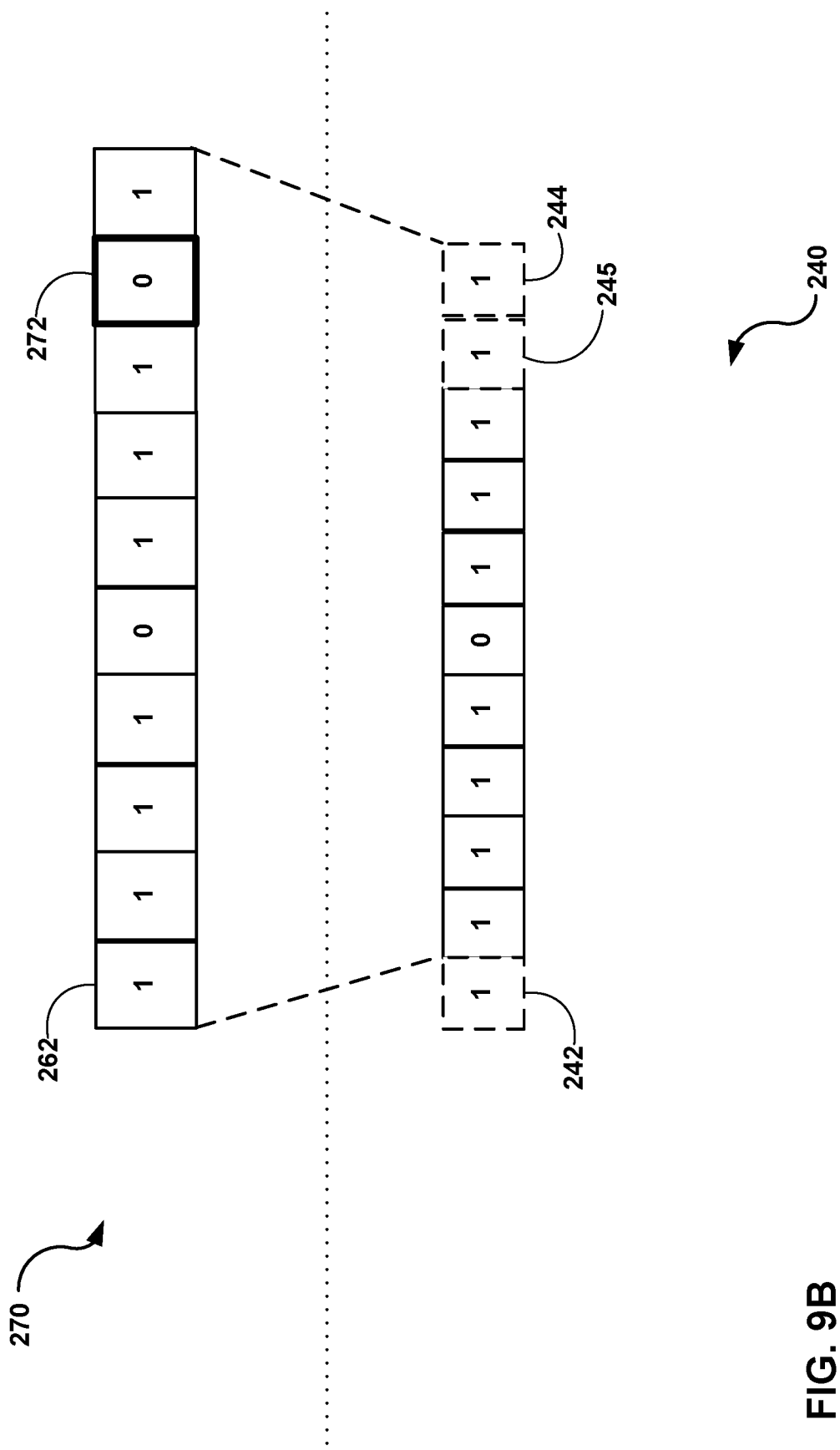

FIGS. 9A and 9B are conceptual diagrams illustrating examples of altered timer traversal paths of this disclosure. As an example illustration, altered bitmask 260 of FIG. 9A represents an altered timer traversal path that timer manager 145 may determine, based on the traversal path represented by bitmask 240 of FIG. 8, for a timer, after the timer graduates from wheel ten (10). Altered bitmask 260 represents an example in which timer manager 145 dynamically changes the remainder of the originally-specified traversal path (represented by original bitmask 240 of FIG. 8) to reduce the total number of remaining wheels to be traversed, while maintaining the original traversal time, within an acceptable margin of error. More specifically, after specifying bit mask 240 for a given timer and enqueuing the timer in an appropriate timer wheel, timer manager 145 may dynamically alters the remainder of the original traversal path by modifying the corresponding bit mask for the timer to account for additional delays in extracting the timer from a queue, i.e. beyond the configured delay for the queue, such that the total traversal time is at least as long as the original traversal time. In some cases, the dynamic adjustment implemented by timer manager 145 may make the total traversal time more accurate than the original calculation represented by bitmask used.

Altered bitmask 260 is shown in comparison with a portion of bitmask 240, to illustrate the alterations that timer manager 145 implements to the timer's traversal path after the timer graduates from wheel ten (10). In the example of FIG. 9A, timer manager 145 expresses the remainder of the timer traversal path after wheel ten (10) using an eight-bit sequence, represented by altered bitmask 260. To generate altered bitmask 260, timer manager 145 truncates least significant bit 244 and penultimate bit 245 of bitmask 240. For this reason, least significant bit 244 and penultimate bit 245 are illustrated using dashed-line borders in the portion of bitmask 240 shown in FIG. 9A, and least significant bit 244 and penultimate bit 245 are not included in altered bitmask 260. Moreover, most significant bit 242 of bitmask 240 is also illustrated using dashed-line borders in FIG. 9A, because timer manager 145 does not include most significant bit 242 in altered bitmask 260, as the timer has already graduated from wheel ten (10) represented by most significant bit 242.

Altered bitmask includes a new most significant bit 262, which corresponds to wheel nine (9) of the traversal path. The three bits that follow new most significant bit 262 are unchanged from the corresponding bits in bitmask 240, and are all significant bits. The last four bits of altered bitmask 260 are illustrated using bold borders in FIG. 9A, to indicate that timer manager 145 has flipped the values of these four bits from the corresponding values in bitmask 240. As such, new least significant bit 264 indicates that wheel five (5) is now included in the new traversal path, as illustrated by the significance of new least significant bit 264. In contrast, wheels four (4), three (3), and two (2) are now excluded from the traversal path, shown by the '0' value of the corresponding bits in altered bitmask 260. Wheels one (1) and zero (0) are also excluded from the new traversal path, as illustrated by the corresponding bits having been truncated and thereby excluded from altered bitmask 260.

The altered traversal time provided by altered bitmask 260 is 2,016 microseconds. The altered traversal time is obtained by summing the TO value(s) already traversed, which in the case of FIG. 9A is 1,024 microseconds. More specifically, the timer has already traversed one wheel, namely wheel ten (10), for which the TO value is given by the equation $2^{10}=1,024$. The remaining traversal time is given by the equation $(2^9)+(2^8)+(2^7)+(2^6)+(2^5)=992$. That is, the remaining traversal time is obtained as the sum of those powers of two (2) that map to the wheel numbers represented by significant bits in altered bitmask 260.

FIG. 9A illustrates an example in which timer manager 145 alters an original traversal path to provide a net reduction of four (4) wheels, while adding one (1) millisecond to the overall traversal time. More specifically, timer manager 145 has removed wheels four (4), three (3), two (2), one (1), and zero (0) from the original traversal path, and added a single wheel, namely wheel five (5), in forming the altered traversal path. Compared to the original traversal time of 2,015 microseconds, the one (1) millisecond increase in traversal time constitutes a deviation of approximately 0.05%, which represents an acceptable margin of error in many use case scenarios in accordance with aspects of this disclosure. For example, timer manager 145 may set 1% as the cutoff for acceptable deviation from an original traversal time, although it will be appreciated that in different implementations, timer manager 145 may set the cutoff for acceptable deviation at various percentages, including integer or decimal values.

FIG. 9B illustrates an example in which timer manager 145 updates a bitmask to remove one or more queues in response to a determination that a timer is not popped out of a queue in time, and so one or more scheduled traversals of short delay queues can be skipped as a compensation measure. According to some aspects of this disclosure, timer manager 145 detects instances in which a timer took a greater length of time to graduate from a wheel than the TO value assigned to the wheel, and dynamically adjusts the remainder of the timer's traversal path to compensate for the additional delay. For instance, timer manager 145 may, in response to detecting longer-than-expected graduation time from one of wheels 192, remove another subsequent wheel 192 from the remainder of the traversal path, to compensate (or approximately compensate) for the previous additional delay. Delay-compensated bitmask 270 of FIG. 9B illustrates such an example. With respect to FIG. 9B, a respective wheel 192 with a longer TO value is described as a "coarser queue" than another wheel 192 with a shorter TO value, which is described herein as a "finer queue" of the traversal path. That is, if a timer exceeds the predetermined TO value before graduating from a coarser queue, then timer manager 145 may mitigate any resulting inequity with respect to the total traversal time by causing the timer to skip a finer queue positioned further down the waterfall-structured traversal path.

In the example of FIG. 9B, timer manager 145 detects an additional delay of approximately two (2) microseconds with respect to the timer graduating from wheel ten (10). That is, timer manager 145 may detect an actual graduation time of ~1,026 microseconds for the timer with respect to wheel ten (10). In response, timer manager 145 changes penultimate bit 244 of bitmask 240 to a '0' value (shown as inverted bit 272) in delay-compensated bitmask 270. The change signifies that timer manager 145 has removed wheel one (1) from the remainder of the waterfall-structured traversal path, to compensate for the unexpected extra two (2) microseconds (approximately) that the timer spent in wheel ten (1). More specifically, timer 145 chooses wheel one (1) for removal, based on wheel one (1) having a TO value of two (2) microseconds (given by the operation 2^1). In this manner, timer manager 145 may modify the waterfall-structured traversal paths on the fly to compensate for previous delays experienced based on actual performance in a previous, coarser queue. The total traversal time for the timer may remain the same or approximately the same as the originally-determined total traversal time, as a result. For instance, timer manager 145 may remove finer queue(s) to produce a total traversal time that is within the predetermined margin of error discussed above with respect to the originally-determined total traversal time for the timer.

Figure 10:
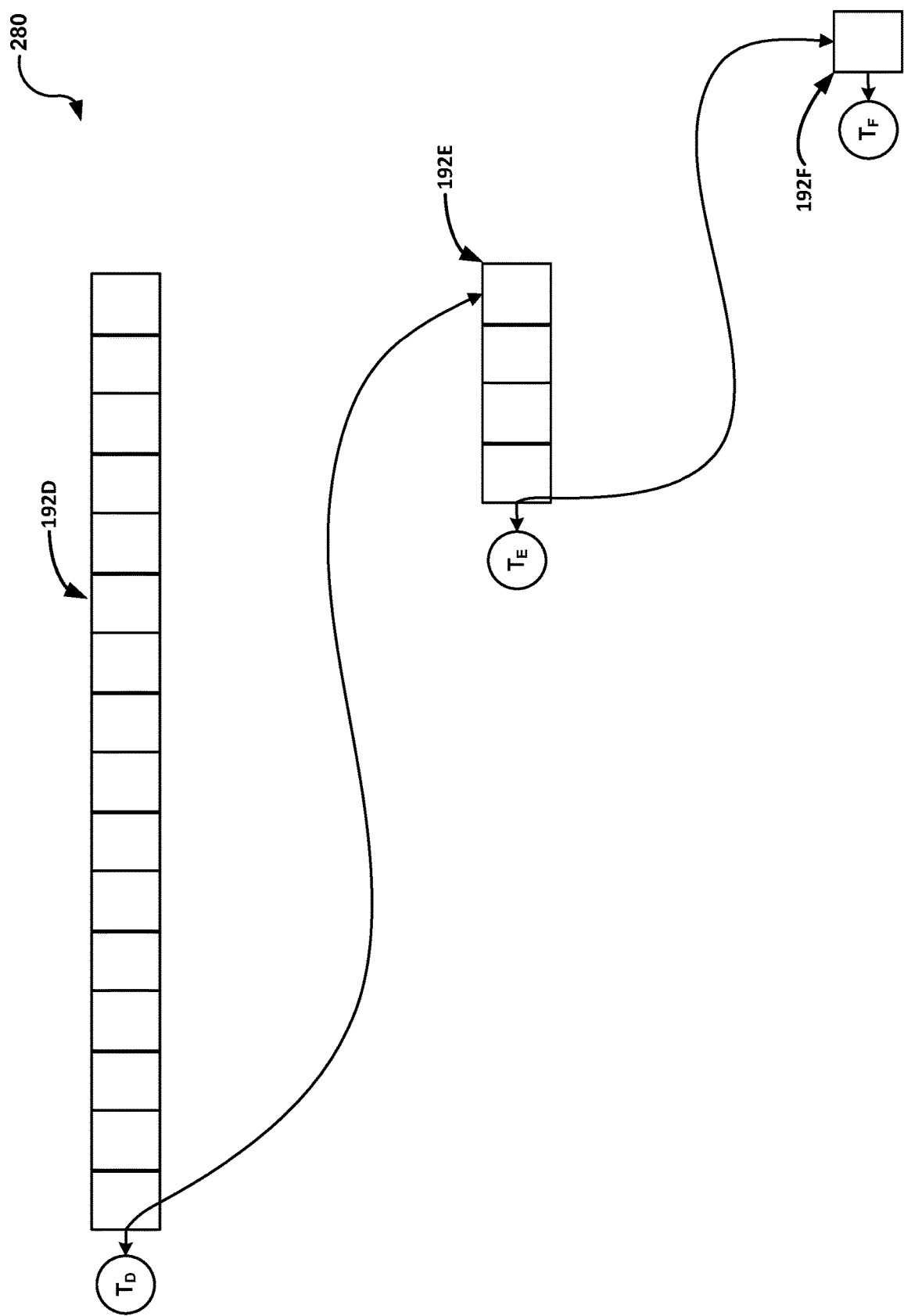
FIG. 10 is a conceptual diagram illustrating an example waterfall-structured traversal path that timer manager 145 formulates for a timer, in accordance with aspects of this disclosure.

FIG. 10 is a conceptual diagram illustrating an example waterfall-structured traversal path 280 that timer manager 145 formulates for a timer, in accordance with aspects of this disclosure. Waterfall-structured traversal path 280 represents, in different examples, a full traversal path or a portion of a larger traversal path. In some of the examples in which waterfall-structured traversal path 280 represents a portion of a larger traversal path, waterfall-structured traversal path 280 forms the ending portion of the larger traversal path. Timer manager 145 forms waterfall-structured traversal path 280 to include three wheels, namely, wheels 192D, 192E, and 192F of wheels 192. In the example of FIG. 10, wheels 192D, 192E, and 192F correspond to wheels four (4), two (2), and zero (0) illustrated in bitmask 240 of FIG. 8.

The relative TO values of wheels 192D-F are illustrated in FIG. 10 by the respective numbers of cells included in wheels 192-F. Wheel 192D includes sixteen (16) cells, to represent a TO value of 2^4=16 microseconds. Because wheel 192D has a TO value equal to the fourth power of two (2), wheel 192D corresponds to wheel four (4) of a multi-wheel traversal option. Similarly, wheel 192E includes four (4) cells, to represent a TO value of 2^2=4 microseconds, and therefore, wheel 192E corresponds to wheel two (2) of the multi-wheel traversal option. Similarly, wheel 192F includes one (1) cell, to represent a TO value of 2^0=1 microseconds, and therefore, wheel 192F corresponds to wheel zero (0) of the multi-wheel traversal option.

According to waterfall-structured traversal path 280, timer manager 145 causes a timer to "fall" through the selected wheels (192D-F) in descending order of TO values. That is, in the specific example of FIG. 10, timer manager 145 causes the timer to: (i) first traverse wheel 192D, which has the greatest TO time of the illustrated wheels, (ii) then next traverse wheel 192E, which has the next-greatest TO value after wheel 192D, and to (iii) then traverse wheel 192F, which has the next-greatest TO value after wheel 192E. In the example of waterfall-structured traversal path 280, wheel 192F is also the final wheel that the timer traverses. Waterfall-structured traversal path 280 is represented by a 10101 bitmask, and therefore provides a total of traversal time of 21 microseconds. In the example of FIG. 10, TD represents a time instance after the timer fulfills the TO value of wheel 192D, TE represents a time instance after the timer fulfills the TO value of wheel 192E, and TF represents a time instance after the timer fulfills the TO value of wheel 192F.

Figure 11:
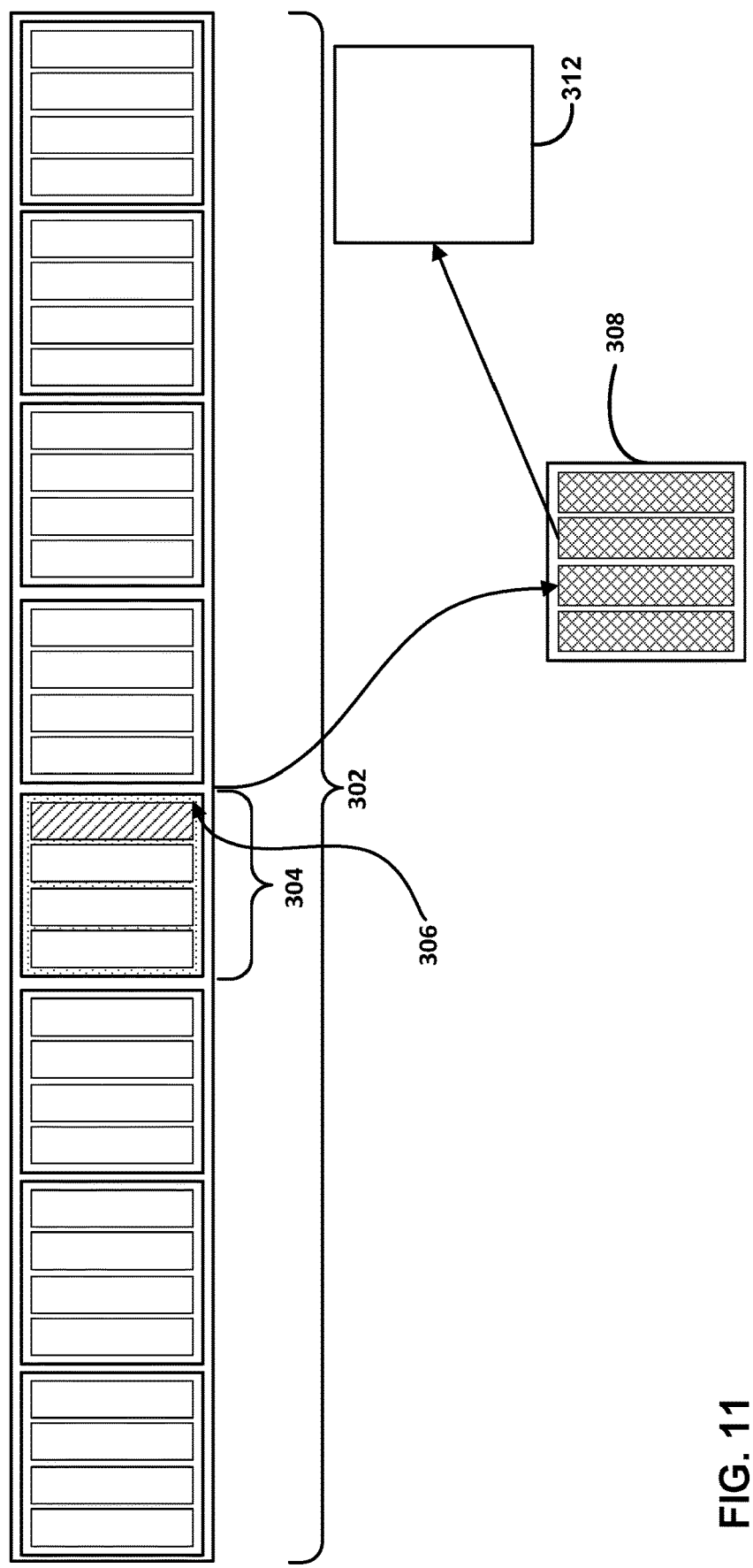
FIG. 11 is a block diagram illustrating an example memory management scheme for timers, according to aspects of this disclosure.

FIG. 11 is a block diagram illustrating an example memory management scheme for timers, according to aspects of this disclosure. As a non-limiting example, memory block 302 represents a portion of memory 134 or other volatile or non-volatile memory of DPU 150. According to some examples of the techniques of this disclosure, timer manager 145 utilizes memory block 302 by dividing memory block 302 into multiple cells. In the example of FIG. 11, timer manager 145 stores four (4) timers to each cell of memory block 302. An example of such a cell is current cell 304, to which timer manager 145 stores data pertinent to current timer 306.

To process current timer 306, timer manager may push current timer 304 to on-chip memory, such as the portion of on-chip memory represented by blockchain-on-chip 308 in FIG. 11. Blockchain-on-chip 308 represents a four-timer cell that is processed (in one example, placed in a single wheel of wheels 192) via on-chip memory of DPU 150. Upon completion of processing all of the timers currently saved to blockchain-on-chip 308, timer manager 145 may then populate the next cell of the on-chip memory, namely, subsequent blockchain-on-chip 312.

In examples, DPU 150 may maintain wheels 192 by implementing a series of pointers to a set of timers. That is, each cell illustrated in each respective wheel 192 of FIG. 10 may represent a pointer to a 64B cell of memory block 302. Each memory cell may contain multiple timer entries, e.g. 4 entries of 16B each. Upon dequeuing all timers within a cell, the timer manager 145 fetches the next cell from memory unit 183.

Figure 12:
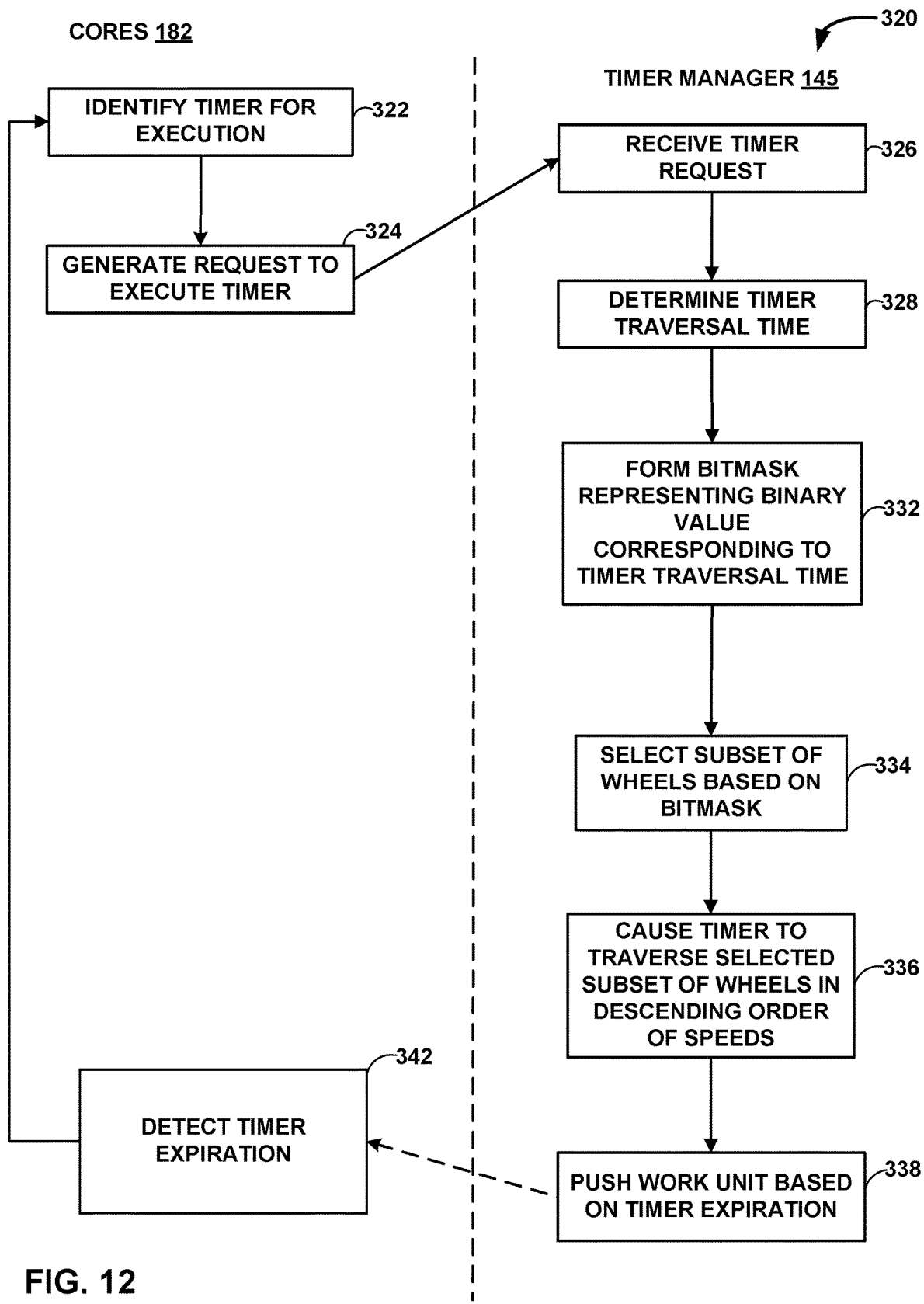
FIG. 12 is a flowchart illustrating an example process that a timer manager may perform, in accordance with aspects of this disclosure.

FIG. 12 is a flowchart illustrating an example process 320 that timer manager 145 may perform, in combination or concert with cores 182, in accordance with aspects of this disclosure. Process 320 may begin when cores 182 identify a timer for execution (322). For instance, cores 182 may identify a timer to be executed by or using timer manager 145. In turn, cores 182 may generate a request to execute the identified timer (324). In some examples, cores 182 may relay the request to timer queue manager 191, which includes timer manager 145.

Timer manager 145 may receive the timer request generated by cores 182 (326). Based on the identity of the timer identified in the request, timer manager 145 determines a total timer traversal time (328). The total timer traversal time corresponds to a single timer, which is the timer identified in the request generated by cores 182. In turn, timer manager 145 forms a bitmask representing a binary value corresponding to the total timer traversal time (332). An example of such a bitmask is bitmask 240 of FIG. 8.

Timer manager 145 selects a subset of wheels 192 based on the bitmask (334). For instance, in the case of a bitmask value of 10101, timer manager selects wheels 192D, 192E, and 192F illustrated in FIG. 10. In turn, timer manager 145 causes the timer to traverse the selected subset of wheels in descending order of speeds (336). For example, in the example of the bitmask value of 10101, timer manager 145 causes the timer to traverse, in descending order of speeds, the wheels illustrated in FIG. 10 by way of waterfall-structured traversal path 280. Once the timer completes traversing the subset of wheels (whether as originally selected or after modification as described with respect to FIGS. 9A and 9B), timer manager may signal the traversal completion by pushing a new work unit to a work unit receive queue of WU queues 143 (338).

Based on the newly-pushed work unit, cores 182 may detect the expiration of the hitherto-executing timer (342). The transition from step to 338 to step 342 is illustrated in FIG. 12 using a dashed line, because timer manager 145 may not necessarily provide a direct communication to cores 182 of the timer expiration. Rather, in some examples, cores 182 may determine the expiration based on activity at WU queues 143. In turn, cores 182 may identify the next timer for execution, thereby iteratively returning to step 322.

In this way, data processing unit 130 represents an example of a device that is configured and/or includes one or more components configured to perform the waterfall-based timer management techniques of this disclosure. Data processing unit 130 includes a memory (which may include, be, or be part of off-chip memory, on-chip memory, such as in the case of memory unit 134, high speed cache memory, coherent memory, or integrated memory of timer manager 145, etc.), and processing circuitry (e.g., that may include, be, or be part of processor 132, and may incorporate one or more of an ASIC, FPGA, fixed function circuitry, programmable processing circuitry, integrated logic circuitry, discrete logic circuitry, etc.) in communication with the memory. The processing circuitry represented by processor 132 may include one or both of fixed function circuitry and/or programmable processing circuitry. The memory unit is configured to store a plurality of successive wheels available to be included in traversal paths for timers running on the device, each of the wheels representing a queue of timers, and each of the wheels having a different, corresponding time delay (TO) values for queuing a timer. The processing circuitry is configured to determine, in response to a request for a timer, a total traversal time with respect to the timer, to select, from the plurality of wheels stored to the memory, a subset of wheels such that a sum of the respective TO values of the selected subset of wheels is within a predetermined margin of error with respect to the total traversal time for the timer, and to sequence the selected subset of wheels according to a descending order of the respective TO values of the selected subset of wheels to form a traversal path with respect to the timer.

In some examples, to select the subset of wheels, the processing circuitry is configured to form a bitmask that corresponds to a binary value representing the total traversal time, to identify one or more significant bits in the bitmask, and to identify, in the plurality of wheels, each respective wheel that corresponds to each respective significant bit in the bitmask. In some examples, the processing circuitry is further configured to place the timer at an end of a first wheel of the traversal path, to determine that the timer has graduated from the first wheel of the traversal path, and in response to the determination that the timer has graduated from the first wheel of the traversal path, to remove a most significant bit from the bitmask to form an updated bitmask, the most significant bit corresponding to the first wheel in the bitmask.

In some examples, the processing circuitry is further configured to determine one or more alternate traversal times, each respective alternate traversal time being within a predetermined margin of error with respect to the traversal time, to determine one or more remaining traversal time options that each represent a respective difference between the respective alternate traversal time and the respective TO value of the first wheel of the traversal path, to select a remaining traversal time for the timer from the remaining traversal time options, and to invert, based on the remaining traversal time selected for the timer, a number of bits (in some examples, three or more bits) of the updated bitmask to form an altered traversal path with respect to the timer. In some examples, to invert the three or more bits, the processing circuitry is configured to change a least significant bit of the bitmask to a zero (0) value in the updated bitmask, and to assign a new least significant bit of the updated bitmask by changing a zero (0) value of the bitmask to a one (1) value in the updated bitmask.

In some examples, the processing circuitry is further configured to detect, based on an actual performance of the timer in the first wheel of the traversal path, a delay with respect to the timer and the first wheel of the traversal path, to determine one or more remaining traversal time options that each represent a respective difference between a respective alternate traversal time and a sum of the respective TO value of the first wheel of the traversal path and the detected delay, to select a remaining traversal time for the timer from the remaining traversal time options, and to round up the delay value, i.e. invert, based on the remaining traversal time selected for the timer, one or more bits of the updated bitmask to form an altered traversal path with respect to the timer. The altered traversal path is guaranteed to equal or larger than the desired timeout value as a result of the rounding up operation.

In this way, data processing unit 130 represents an example of an apparatus that includes means for performing various techniques of this disclosure. For instance, the apparatus of data processing unit 130 includes means for maintaining a plurality of successive wheels available to be included in traversal paths for timers running on the device, each of the wheels representing a queue of timers, and each of the wheels having a different, corresponding time delay (TO) values for queuing a timer, means for determining, in response to a request for a timer, a total traversal time with respect to the timer, means for selecting, from the plurality of wheels, a subset of wheels such that a sum of the respective TO values of the selected subset of wheels is within a predetermined margin of error with respect to the total traversal time for the timer, and means for sequencing the selected subset of wheels according to a descending order of the respective TO values of the selected subset of wheels to form a traversal path with respect to the timer.

In one or more examples, the functions described may be implemented in hardware, software, firmware, or any combination thereof. If implemented in software, the functions may be stored on, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, processing circuitry (including fixed function circuitry and/or programmable processing circuitry), application specific integrated circuits (ASICs), field programmable logic arrays (FPGAs), or other equivalent integrated circuitry or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chipset). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   maintaining, by a timer manager of a device, a plurality of successive wheels available to be included in traversal paths for timers running on the device, each of the wheels representing a queue of timers, and each of the wheels having a different, corresponding time delay (TO) values for queuing a timer;
   responsive to a request for a timer, determining, by the timer manager of the device, a total traversal time with respect to the timer;
   selecting, by the timer manager of the device, from the plurality of wheels, a subset of wheels such that a sum of the respective TO values of the selected subset of wheels is within a predetermined margin of error with respect to the total traversal time for the timer; and
   sequencing, by the timer manager of the device, the selected subset of wheels based on the respective TO values of the selected subset of wheels to form a traversal path with respect to the timer.

2. The method of claim 1, wherein selecting the subset of wheels comprises:
   forming, by the timer manager of the device, a bitmask that corresponds to a binary value representing the total traversal time;
   identifying, by the timer manager of the device, one or more significant bits in the bitmask; and
   identifying, by the timer manager of the device, in the plurality of wheels, each respective wheel that corresponds to each respective significant bit in the bitmask.

3. The method of claim 2, further comprising:
   placing, by the timer manager of the device, the timer at an end of a first wheel of the traversal path;
   determining, by the timer manager of the device, that the timer has graduated from the first wheel of the traversal path;
   in response to determining that the timer has graduated from the first wheel of the traversal path, removing, by the timer manager of the device, a most significant bit from the bitmask to form an updated bitmask, the most significant bit corresponding to the first wheel in the bitmask.

4. The method of claim 3, further comprising:
   determining one or more alternate traversal times, each respective alternate traversal time being within a predetermined margin of error with respect to the traversal time;
   determining, by the timer manager of the device, one or more remaining traversal time options that each represent a respective difference between the respective alternate traversal time and the respective TO value of the first wheel of the traversal path;
   selecting, by the timer manager of the device, a remaining traversal time for the timer from the remaining traversal time options; and
   based on the remaining traversal time selected for the timer, inverting, by the timer manager of the device, one or more bits of the updated bitmask to form an altered traversal path with respect to the timer.

5. The method of claim 4, wherein inverting the one or more bits comprises:
   changing, by the timer manager of the device, a least significant bit of the bitmask to a zero (0) value in the updated bitmask; and
   assigning, by the timer manager of the device, a new least significant bit of the updated bitmask by changing a zero (0) value of the bitmask to a one (1) value in the updated bitmask.

6. The method of claim 3, further comprising:
   detecting, based on an actual performance of the timer in the first wheel of the traversal path, a delay with respect to the timer and the first wheel of the traversal path;
   determining, by the timer manager of the device, one or more remaining traversal time options that each represent a respective difference between a respective alternate traversal time and a sum of the respective TO value of the first wheel of the traversal path and the detected delay; and selecting, by the timer manager of the device, a remaining traversal time for the timer from the remaining traversal time options; and based on the remaining traversal time selected for the timer, inverting, by the timer manager of the device, one or more bits of the updated bitmask to form an altered traversal path with respect to the timer.

7. The method of claim 1, wherein sequencing the selected subset of wheels based on the respective TO values of the selected subset of wheels comprises sequencing, by the timer manager of the device, the selected subset of wheels according to a descending order of the respective TO values of the selected subset of wheels to form a traversal path with respect to the timer.

8. A device comprising:
a memory configured to store a plurality of successive wheels available to be included in traversal paths for timers running on the device, each of the wheels representing a queue of timers, and each of the wheels having a different, corresponding time delay (TO) values for queuing a timer; and
processing circuitry in communication with the memory, the processing circuitry being configured to:
determine, in response to a request for a timer, a total traversal time with respect to the timer;
select, from the plurality of wheels stored to the memory, a subset of wheels such that a sum of the respective TO values of the selected subset of wheels is within a predetermined margin of error with respect to the total traversal time for the timer; and
sequence the selected subset of wheels based on the respective TO values of the selected subset of wheels to form a traversal path with respect to the timer.

9. The device of claim 8, wherein, to select the subset of wheels, the processing circuitry is configured to:
form a bitmask that corresponds to a binary value representing the total traversal time;
identify one or more significant bits in the bitmask; and
identify, in the plurality of wheels, each respective wheel that corresponds to each respective significant bit in the bitmask.

10. The device of claim 8, wherein the processing circuitry is further configured to:
place the timer at an end of a first wheel of the traversal path;
determine that the timer has graduated from the first wheel of the traversal path;
in response to the determination that the timer has graduated from the first wheel of the traversal path, remove a most significant bit from the bitmask to form an updated bitmask, the most significant bit corresponding to the first wheel in the bitmask.

11. The device of claim 10, wherein the processing circuitry is further configured to:
determine one or more alternate traversal times, each respective alternate traversal time being within a predetermined margin of error with respect to the traversal time;
determine one or more remaining traversal time options that each represent a respective difference between the respective alternate traversal time and the respective TO value of the first wheel of the traversal path;
select a remaining traversal time for the timer from the remaining traversal time options; and
invert, based on the remaining traversal time selected for the timer, one or more bits of the updated bitmask to form an altered traversal path with respect to the timer.

12. The device of claim 11, wherein to invert the one or more bits, the processing circuitry is configured to:
change a least significant bit of the bitmask to a zero (0) value in the updated bitmask; and
assign a new least significant bit of the updated bitmask by changing a zero (0) value of the bitmask to a one (1) value in the updated bitmask.

13. The device of claim 10, wherein the processing circuitry is further configured to:
detect, based on an actual performance of the timer in the first wheel of the traversal path, a delay with respect to the timer and the first wheel of the traversal path;
determine one or more remaining traversal time options that each represent a respective difference between a respective alternate traversal time and a sum of the respective TO value of the first wheel of the traversal path and the detected delay; and
select a remaining traversal time for the timer from the remaining traversal time options; and
invert, based on the remaining traversal time selected for the timer, one or more bits of the updated bitmask to form an altered traversal path with respect to the timer.

14. The device of claim 8, wherein to sequence the selected subset of wheels based on the respective TO values of the selected subset of wheels, the processing circuitry is configured to sequence the selected subset of wheels according to a descending order of the respective TO values of the selected subset of wheels.

15. The device of claim 8, wherein the processing circuitry comprises at least a portion of an application-specific integrated circuit (ASIC).

16. The device of claim 8, wherein the processing circuitry comprises discrete logic circuitry.

17. The device of claim 8, wherein the processing circuitry comprises fixed function circuitry.

18. The device of claim 8, wherein the processing circuitry comprises an application specific integrated circuit (ASIC).

19. A non-transitory computer-readable storage medium encoded with instructions that, when executed, cause processing circuitry of a device to:
store, to a memory, a plurality of successive wheels available to be included in traversal paths for timers running on the device, each of the wheels representing a queue of timers, and each of the wheels having a different, corresponding time delay (TO) values for queuing a timer;
determine, in response to a request for a timer, a total traversal time with respect to the timer;
select, from the plurality of wheels stored to a memory, a subset of wheels such that a sum of the respective TO values of the selected subset of wheels is within a predetermined margin of error with respect to the total traversal time for the timer; and
sequence the selected subset of wheels based on the respective TO values of the selected subset of wheels to form a traversal path with respect to the timer.

20. The non-transitory computer-readable storage medium of claim 19, wherein the instructions that cause the processing circuitry to select the subset of wheels comprise instructions that, when executed, cause the processing circuitry to:
form a bitmask that corresponds to a binary value representing the total traversal time;
identify one or more significant bits in the bitmask; and identify, in the plurality of wheels, each respective wheel that corresponds to each respective significant bit in the bitmask.

21. The non-transitory computer-readable storage medium of claim 19, further encoded with instructions that, when executed, cause the processing circuitry to:
place the timer at an end of a first wheel of the traversal path;
determine that the timer has graduated from the first wheel of the traversal path;
in response to the determination that the timer has graduated from the first wheel of the traversal path, remove a most significant bit from the bitmask to form an updated bitmask, the most significant bit corresponding to the first wheel in the bitmask.

22. The non-transitory computer-readable storage medium of claim 21, further encoded with instructions that, when executed, cause the processing circuitry to:
determine one or more alternate traversal times, each respective alternate traversal time being within a predetermined margin of error with respect to the traversal time;
determine one or more remaining traversal time options that each represent a respective difference between the respective alternate traversal time and the respective TO value of the first wheel of the traversal path;
select a remaining traversal time for the timer from the remaining traversal time options; and
invert, based on the remaining traversal time selected for the timer, one or more bits of the updated bitmask to form an altered traversal path with respect to the timer.

23. The non-transitory computer-readable storage medium of claim 22, wherein the instructions that cause the processing circuitry to invert the one or more bits comprise instructions that, when executed, cause the processing circuitry to:
change a least significant bit of the bitmask to a zero (0) value in the updated bitmask; and
assign a new least significant bit of the updated bitmask by changing a zero (0) value of the bitmask to a one (1) value in the updated bitmask.

24. The non-transitory computer-readable storage medium of claim 21, further encoded with instructions that, when executed, cause the processing circuitry to:
detect, based on an actual performance of the timer in the first wheel of the traversal path, a delay with respect to the timer and the first wheel of the traversal path;
determine one or more remaining traversal time options that each represent a respective difference between a respective alternate traversal time and a sum of the respective TO value of the first wheel of the traversal path and the detected delay; and
select a remaining traversal time for the timer from the remaining traversal time options; and
invert, based on the remaining traversal time selected for the timer, one or more bits of the updated bitmask to form an altered traversal path with respect to the timer.

25. The non-transitory computer-readable storage medium of claim 19, wherein the instructions that cause the processing circuitry to sequence the selected subset of wheels based on the respective TO values of the selected subset of wheels comprise instructions that, when executed, cause the processing circuitry to sequence the selected subset of wheels according to a descending order of the respective TO values of the selected subset of wheels.

26. An apparatus comprising:
means for maintaining a plurality of successive wheels available to be included in traversal paths for timers running on the device, each of the wheels representing a queue of timers, and each of the wheels having a different, corresponding time delay (TO) values for queuing a timer;
means for determining, in response to a request for a timer, a total traversal time with respect to the timer;
means for selecting, from the plurality of wheels, a subset of wheels such that a sum of the respective TO values of the selected subset of wheels is within a predetermined margin of error with respect to the total traversal time for the timer; and
means for sequencing the selected subset of wheels according to a descending order of the respective TO values of the selected subset of wheels to form a traversal path with respect to the timer.

* * * * *